United States Patent
Aery et al.

(10) Patent No.: US 11,922,445 B1
(45) Date of Patent: Mar. 5, 2024

(54) USING NATIVE AND NON-NATIVE EVENTS TO CONTROL FUNDING/ACTIONS ON VARIOUS CONNECTED DIGITAL PLATFORMS

(71) Applicant: Wells Fargo Bank, N.A., San Francisco, CA (US)

(72) Inventors: Sameer Aery, Charlotte, NC (US); Nathan Bray, Salt Lake City, UT (US); Frank Fehrenbach, New York, NY (US); Sreenivas Vas Kodali, Charlotte, NC (US); Ashish B. Kurani, Hillsborough, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/529,097

(22) Filed: Nov. 17, 2021

Related U.S. Application Data

(60) Provisional application No. 63/170,275, filed on Apr. 2, 2021, provisional application No. 63/115,479, filed on Nov. 18, 2020.

(51) Int. Cl.
*G06Q 30/00* (2023.01)
*G06Q 30/0207* (2023.01)
*G05B 19/418* (2006.01)

(52) U.S. Cl.
CPC .............................. *G06Q 30/0207* (2013.01)

(58) Field of Classification Search
CPC ................................................ G06Q 30/0207
See application file for complete search history.

(56) References Cited

U.S. PATENT DOCUMENTS

| | | | |
|---|---|---|---|
| 11,151,888 B1* | 10/2021 | Fillinger | ............... G07F 17/0035 |
| 2013/0080326 A1* | 3/2013 | Jacola | ..................... G06Q 20/40 |
| | | | 705/44 |
| 2016/0210605 A1* | 7/2016 | Vaish | ...................... G06Q 20/36 |
| 2017/0046697 A1 | 2/2017 | Sheehan et al. | |
| 2018/0158057 A1 | 6/2018 | Kirch et al. | |
| 2019/0306137 A1 | 10/2019 | Isaacson et al. | |

OTHER PUBLICATIONS

"M-payments". IEEE. 2003. (Year: 2003).*

(Continued)

*Primary Examiner* — Maria V Vanderhorst
(74) *Attorney, Agent, or Firm* — Foley & Lardner LLP

(57) ABSTRACT

A method, apparatus, and system of using native and non-native events to control incentives in a computing environment is provided. A method includes: creating, by a processing circuit, a master account; creating, by the processing circuit, a subordinate account linked to the master account; receiving, by the processing circuit and from the master account, a first task and an associated incentive for the first task; detecting, by the processing circuit, a native or non-native event regarding the first task; and, implementing, by the processing circuit, an action corresponding to the associated incentive based on detecting the native or non-event regarding the first task. Detecting the native event includes receiving a message directly from a device linked to the processing circuit. Detecting a non-native event includes receiving an indication from a user device associated with the subordinate account.

17 Claims, 11 Drawing Sheets

(56) References Cited

OTHER PUBLICATIONS

"Blockchain-Based Identity Management: A Survey From the Enterprise and Ecosystem Perspective".IEEE.2020. (Year: 2020).*
Blockchain-Based Identity Management: A Survey From the Enterprise and Ecosystem Perspective Published in: IEEE Transactions on Engineering Management (vol. 67, Issue: 4, pp. 1008-1027) Authors: Michael Kuperberg (Year: 2019).
Session 1: Cloud computing and information security Published in: 2017 International Conference on Information Society (i-Society) (pp. 1-149) (Year: 2017).

* cited by examiner

USING NATIVE AND NON-NATIVE EVENTS TO CONTROL FUNDING/ACTIONS ON VARIOUS CONNECTED DIGITAL PLATFORMS

CROSS-REFERENCE TO RELATED APPLICATIONS

The present application claims the benefit of and priority to U.S. Provisional Application No. 63/115,479, titled "Systems and Methods for Providing a Management Platform for Digital Platform Services," filed Nov. 18, 2020, and U.S. Provisional Application No. 63/170,275, titled "Systems and Methods for Providing a Management Platform for Digital Platform Services," filed Apr. 2, 2021, both of which are incorporated herein by reference in their entireties.

TECHNICAL FIELD

Embodiments of the present disclosure relate to systems and methods for management of a digital platform service.

BACKGROUND

Digital platforms offer a variety of services to customers including streaming services, gaming services, and utility services. Recently, the number of digital platforms available to customers/users and their non-adult family members has significantly increased. However, the digital nature of the digital platforms restricts the visibility of how they are being used by other users (e.g., non-adult members). Moreover, many digital platforms allow for a user to make in application purchases (IAPB) using previously stored payment account information, which may allow unauthorized transactions to be made from an authorized user of the digital platform.

SUMMARY

One embodiment relates to a method of providing a management system for digital platforms in a computing environment. The method includes: creating, in response to receiving an indication to enroll in a management platform, a master account, the master account having master login credentials associated therewith; providing a management graphical user interface (GUI) to a user device in response to a login using the master login credentials; creating a subordinate account in response to a first user selection via the management GUI, the subordinate account having subordinate login credentials associated therewith; establishing one or more funding rules for the subordinate account; establishing one or more spending rules for the subordinate account; approving a first in-app purchase (IAP) from the subordinate account; and, providing a dashboard via the management GUI, the dashboard comprising a ledger of transactions, the ledger of transactions comprising the first IAP.

Another embodiment relates to a system comprising a processing circuit including a processor and memory. The memory stores instructions that, when executed by the processor, cause the processing circuit to: create, in response to receiving an indication to enroll in a management platform, a master account, the master account having master login credentials associated therewith; provide a management GUI to a user device in response to a login using the master login credentials; create a subordinate account in response to a first user selection via the management GUI, the subordinate account having subordinate login credentials associated therewith; establish one or more funding rules for the subordinate account; establish one or more spending rules for the subordinate account; approve a first IAP from the subordinate account; and provide a dashboard via the management GUI, the dashboard comprising a ledger of transactions, the ledger of transactions comprising the first IAP.

Another embodiment relates to a non-transitory computer readable media having computer-executable instructions embodied therein that, when executed by a processor of a provider institution computing system, cause the processor to perform operations including: creating, in response to receiving an indication to enroll in a management platform, a master account, the master account having master login credentials associated therewith; providing a management graphical user interface (GUI) to a user device in response to a login using the master login credentials; creating a subordinate account in response to a first user selection via the management GUI, the subordinate account having subordinate login credentials associated therewith; establishing one or more funding rules for the subordinate account; establishing one or more spending rules for the subordinate account; approving a first in-app purchase (IAP) from the subordinate account; and, providing a dashboard via the management GUI, the dashboard comprising a ledger of transactions, the ledger of transactions comprising the first IAP.

Another embodiment relates to a method of using native and non-native events to control incentives in a computing environment. The method includes: creating, by a processing circuit, a master account; creating, by the processing circuit, a subordinate account linked to the master account; receiving, by the processing circuit and from the master account, a first task and an associated incentive for the first task; detecting, by the processing circuit, a native or non-native event regarding the first task; and, implementing, by the processing circuit, an action corresponding to the associated incentive based on detecting the native or non-event regarding the first task. In one embodiment, detecting the native event comprises receiving, by the processing circuit, a message directly from a device linked to the processing circuit. In one embodiment, detecting a non-native event comprises receiving, by the processing circuit, an indication from a user device associated with the subordinate account.

Another embodiment relates to a system. The system includes a processing circuit including a processor and memory. The memory stores instructions that, when executed by the processor, cause the processing circuit to: create a master account; create a subordinate account linked to the master account; receive from the master account, a first task and an associated incentive for the first task; detect a native or non-native event regarding the first task; and, implement an action corresponding to the associated incentive based on detecting the native or non-event regarding the first task. Detecting the native event may include receiving a message directly from a device linked to the processing circuit. Detecting a non-native event may include receiving an indication from a user device associated with the subordinate account.

Another embodiment relates to a non-transitory computer readable media having computer-executable instructions embodied therein that, when executed by a processor of a provider institution computing system, cause the processor to perform operations including: creating a master account; creating a subordinate account linked to the master account; receiving, from the master account, a first task and an associated incentive for the first task; detecting a native or non-native event regarding the first task; and, implementing an action corresponding to the associated incentive based on detecting the native or non-event regarding the first task. Detecting the native event may include receiving a message directly from a device linked to the processing circuit. Detecting a non-native event may include receiving an indication from a user device associated with the subordinate account.

Another embodiment relates to a method of linking an automated teller machine (ATM) with a digital platform to fulfill incentives. The method includes: coupling, by a processing circuit of a provider institution computing system, a master account associated with a user to at least one digital platform hosted by a digital platform computing system; receiving, by the processing circuit, an indication to create a subordinate account and creating the subordinate account based on the indication; linking, by the processing circuit, the subordinate account to the master account and the subordinate account to a subordinate account user device; receiving, by the processing circuit and from a user device associated with the master account, an objective along with an associated incentive linked to the subordinate account; generating and providing, in response to receiving an indication that the objective has been met, a code or a token to the subordinate account user device; receiving, by the processing circuit and from the ATM, an indication that the code or the token has been received; validating, by the processing circuit, the received code or token; and, commanding, by the processing circuit, a fulfillment of the corresponding incentive via the ATM based on validating the received code or token.

Another embodiment relates to an ATM. The ATM includes a network interface configured to communicate with a remote computing system through a network, an input/output (I/O) interface configured to interface with a user of the ATM, and a processing circuit comprising a processor and memory. The memory is structured to store instructions that are executable by the processor and cause the processing circuit to: receive, via the I/O interface, a code or a token from a user device associated with a user, the code or token being associated with an objective and a corresponding incentive and being provided by a digital platform provide by a digital platform computing system; transmit an indication to the remote computing system that the code or token has been received; receive, from the remote computing system, the incentive associated with the code or token, the incentive corresponding to an amount of funds; and fulfill the incentive by disbursing the amount of funds.

Another embodiment relates to a system. The system includes a processing circuit including a processor and memory. The memory stores instructions that, when executed by the processor, cause the processing circuit to: couple a master account associated with a user to at least one digital platform hosted by a digital platform computing system; receive an indication to create a subordinate account and creating the subordinate account based on the indication; link the subordinate account to the master account and the subordinate account to a subordinate account user device; receive, from a user device associated with the master account, an objective along with an associated incentive linked to the subordinate account; generate and provide, in response to receiving an indication that the objective has been met, a code or a token to the subordinate account user device; receive, from the ATM, an indication that the code or the token has been received; validate the received code or token; and command a fulfillment of the corresponding incentive via the ATM based on validating the received code or token.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
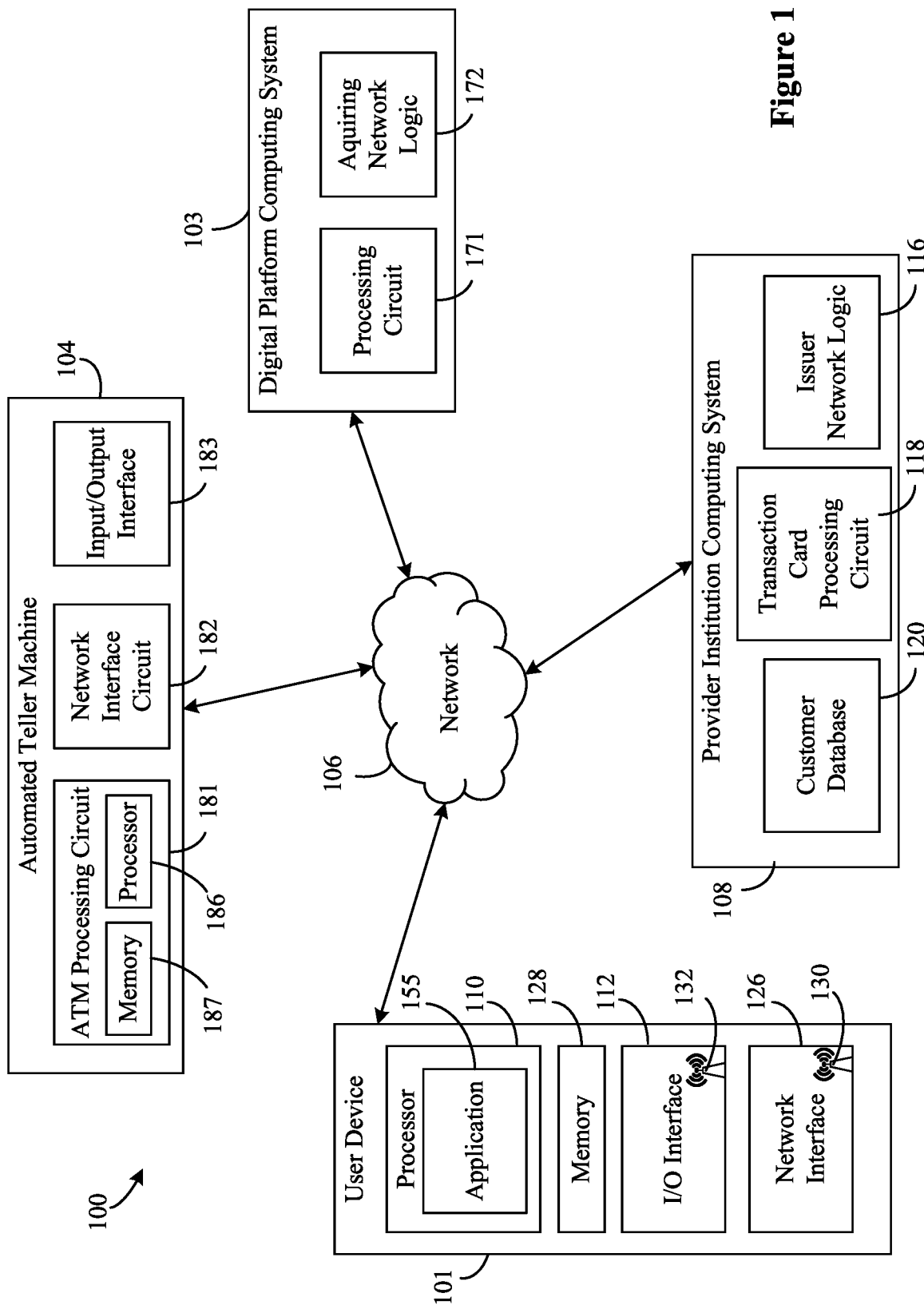
FIG. 1 is a computing environment having a digital platform, according to an example embodiment.

Systems, apparatuses, and methods for providing and managing capabilities of digital platform are disclosed according to various embodiments herein. A digital platform provides various digital services to a user via a user device. For example, various digital platforms may provide a streaming service (e.g., Netflix®, Hulu®, Amazon Video®, etc.), gaming capabilities (e.g., PlayStation®, Xbox®, Nintendo®, Steam® etc.), and/or other services (e.g., Google Play®, Apple® App Store) to a user. In various embodiments, the digital platform allows for the user to make in-app purchases (IAPB) to access or receive additional services via the user device directly in an application provided by the digital platform. For example, the digital platform may allow a user to purchase an application (e.g., an application from an app store), additional storage (e.g., cloud storage), games or gaming packages (e.g., costumes, characters, etc.), access to additional software features (e.g., drafting software), virtual currencies (e.g., VBucks®), and so on. As an example, in order to make the in-app purchases, the user must enter payment credentials into the application or otherwise associate the payment credentials with a corresponding account at the digital platform. However, once the payment credentials are provided to and/or associated with an account at the digital platform, any user that accesses the account may be able to complete transactions. For example, a first user (e.g., an adult) may initiate an account on a digital platform (e.g., Xbox®) and associate a payment account with the account. Further, the first user then may grant a second user access to (e.g., a child). The second user may begin to make IAP on the account either inadvertently or on purpose. Consequentially, the IAPB will be debited from the payment account of the first user to their surprise. That is, because the digital platform is unable to identify the particular user that is accessing the account after an initial login/authentication, the digital platform is not capable of verifying that the user associated with the provided payment account is authorizing the IAPB. Accordingly, the disclosure described herein are directed to providing a management platform (e.g., a payment platform) within the digital platform to enable the associated computing devices with the ability to monitor, restrict, and/or identify unauthorized IAPB. For example, the management platform is a platform that allows a first user (e.g., via a master account) to control one or more operations or interactions of a second user (e.g., via a sub account) with one or more digital platforms. One example of the management platform may include a payment platform that enables the computing system to restrict, for example, the IAPB made from the second user according to one or more rules defined by the master account. The communicable coupling between a provider institution computing system and the digital platform in a secure manner that concurrently provides coupling to one or more computing devices results in an improved digital platform because of its expanded connections. Further, the arrangement described herein may utilize the provider institution computing system's resources as compared to those of the digital platform to maintain operability of the digital platform in an accustomed manner (e.g., download speeds, etc.) despite the additional connections included therewith. As used herein "in-app purchases" (IAP) include any purchase made within an application running on a user device using a stored and/or associated payment account.

Referring now to FIG. 1, a computing environment 100 having a digital platform is shown according to an example embodiment. The computing environment 100 includes a master user device 101, a provider computing system 108, an automated teller machine (ATM) 104, and a digital platform provider computing system 103 connected via a network 106. The network 106 may be any type of type of network. For example, the network 106 may be a wireless network interface (e.g., Internet, Wi-Fi, etc.), a wired network interface (e.g., Ethernet), or any combination thereof. While the network 106 generally refers to the definition provided above, in some embodiments, the network 106 also includes financial networks associated with various payment brands (e.g., card networks such as Visa®, American Express®, Discover®, MasterCard®, etc.). When the network 106 is used to refer to these types of networks, the term "card network" or "payment network" is used herein. Otherwise, the aforementioned definition for the network 106 is intended. The network 106 is structured to permit the exchange of data, values, instructions, messages, and the like between and among various components of FIG. 1.

The user device 101 is owned by or otherwise associated with a customer/user. The user may be an individual, business representative, large and small business owner, and so on. The user or customer may be an existing or a new customer to the provider institution associated with the provider institution computing system 108. The user device 101 is structured to enable the user to access the network 106 (e.g., to send and receive information/data over the network), for example, to access a digital platform. Examples of the user device 101 include a mobile device, such as a mobile phone such as a smartphone, a tablet, a wearable computing device (e.g., eyewear, augmented reality eyewear), a personal computing, a gaming system (e.g., Xbox®, Nintendo®, PlayStation®, etc.) and so on. In the example shown, the user device 101 is structured as a gaming system. In other embodiments, the user device 101 may be a different computing device, such as a desktop computer, mobile phone, or tablet. In the example shown, the user device 101 includes a processor 110, memory 128, an input/output interface 112, and a network interface 126. In various embodiments, the user device 101 may also include or otherwise be coupled to one or more input/output devices such as a display (e.g., touchscreen), microphone, and/or one or more cameras or detectors (e.g., a gesture tracking system, eye tracking system, etc.). In various embodiments, multiple user devices 101 may be coupled to the network 106. In some embodiments, the multiple user devices 101 may include a master user device (e.g., computer, smartphone, etc.), associated with a master user, and a sub user device (e.g., computer, smartphone, etc.) associated with a subordinate user.

The user device 101 may include program logic (e.g., instructions) stored by the memory 128 and executable by the processor 110 to implement at least some of the functions described herein. The processor 110 may be implemented as one or more processors, an application specific integrated circuit (ASIC), one or more field programmable gate arrays (FPGAs), a digital signal processor (DSP), a group of processing components, or other suitable electronic processing components. The one or more memory devices 128 (e.g., RAM, NVRAM, ROM, Flash Memory, hard disk storage, etc.) may store data and/or computer code for facilitating the various processes described herein. Moreover, the one or more memory devices 128 may be or include tangible, non-transient volatile memory or non-volatile memory. Accordingly, the one or more memory devices 128 may include database components, object code components, script components, or any other type of information structure for supporting the various activities and information structures described herein.

In some embodiments, the processor 110 may be configured to download and execute a software application of the user device 101 (e.g., application 155). For example, a developer may make or create the software application to be downloaded (e.g., via the developer's website, via an app store, or in another manner) that, for example, enables the user device 101 to access a digital platform. Responsive to a customer selection of an appropriate link, the software application can be transmitted to the user device 101 and cause itself to be installed on the user device 101. Installation of the software application creates a customer application that is executable by the processor 110. Examples of downloadable applications include a gaming application (e.g., Fortnite®), a streaming application (e.g., Netflix®), utility applications (e.g., rendering applications) and so on.

The management platform (e.g., the payment platform) may be structured as a management software application 155 executable via the processor 110. In this regard, the management software application 155 may perform at least some of the operations described herein with respect to the management platform. As also described herein, the provider institution computing system 108 may provide and support the management software application 155. Thus, the provider institution computing system 108 may additionally or alternatively perform at least some of the functions of the management platform as described herein. In other embodiments, certain activities/capabilities and/or functionalities of the management platform may be performed by other components/devices of the computing environment 100 (e.g., the digital platform computing system 103). The management platform is configured to interface or interact (e.g., via a management or subordinate GUI provided via the application 155) with a first user, second user, one or more digital platform computing systems 103, and/or the provider institution computing system 108 to enable the computing environment to control the use or interactions of the second user with one or more digital computing system. For example, the management platform may include a payment platform configured to enable the second user to make IAPB while also restricting the second user (e.g., via a sub account) from making unauthorized IAPB. In yet another example, the management software application 155 (e.g., acting as an interface to the payment platform) may be integrated with an existing digital platform application and/or a mobile banking application created and provided by the provider institution.

The processor 110 is also structured to execute thick client applications as well (e.g., via a web browser). In either situation, the execution of the application (either thick, thin, or smart client application) may enable the user to access one or more services provided from the application and make purchases directly within the application. Or, more generally, execution of the application allows functions associated with that application. Alternatively or additionally, the user device 101 may come pre-loaded with one or more applications or be configured to execute applications read from external sources (e.g., a disk drive, flash drive, etc.).

The network interface 126 may include one or more antennas 132 and associated communications hardware and logic. The network interface 126 is structured to allow the processor 110 to access and connect to the network 106 to, in turn, exchange information with for example the provider institution computing system 108. That is, the network interface 126 is coupled to the processor 110 and memory 128 and configured to enable a coupling to the network 106. The network interface 126 allows for the user device 101 to transmit and receive internet data and telecommunication data. Accordingly, the network interface 126 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver).

The user device 101 further includes input/output interface 112. The input/output interface 112 is structured to allow a user to interact with the user device via various inputs. For example, input/output interface 112 may include one or more antennas structured to wirelessly communicate with one or more devices (e.g., a controller). In various examples, the input/output interface 112 may include or be configured to interface with a display such as a touchscreen, one or more detection systems such as an eye or gesture tracking system, and/or other devices such as a keyboard, mouse, one or more cameras, and so on.

The provider institution computing system 108 may be owned by or otherwise associated with a provider institution. The provider institution provides and manages one or more payment accounts for various users. The provider institution may a financial institution, such as commercial or private banks, credit unions, investment brokerages, and so on. The provider institution can also include any commercial entity capable of maintaining charge accounts, including retailers, vendors, service providers, and the like. In the example shown, the provider institution is an issuer of a payment account of the user. In various embodiments, the payment account may have one or more tokens, payment account numbers (PAN), credit cards, and/or debit cards associated therewith (e.g., and issued from the provider institution). Accordingly, the provider institution and associated provider institution computing system 108 may also be referred to herein as the card issuer and card issuer computing system 108 herein. The card issuer computing system 108 is configured to manage charge accounts and authorize transactions involving debits from charge accounts associated with existing customers.

The provider institution computing system 108 includes an issuer network logic 116, a transaction card processing circuit 118, and a customer database 120. The issuer network logic 116 is structured to enable the card issuer computing system 108 to connect to and to exchange information over the network 106 with, for example, the user device 101 and/or the digital platform provider service. The issuer network logic 116 may include a network interface structured to send and receive data over the network 106.

The customer database 120 is structured as a repository for information. In this regard, the customer database 120 is configured to store, hold, and maintain information for a plurality of customers of the provider institution. For example, the database 120 may store information for customers with issued cards, including for example, personal customer information (e.g., names, addresses, phone numbers, and so on) and financial information (e.g., associated financial institutions, account numbers, available credit, credit history, and so on). The information contained in the customer database 120 may be used by the card issuer computing system 108 to perform a variety of checks surrounding a given transaction, including for example, authenticating a payment transaction based on information received in a payment transaction message via a payment network.

The transaction card processing circuit 118 is structured to process or facilitate processing of transactions (e.g., transactions made using cards or tokens issued by the provider institution). The transaction card processing circuit 118 is structured to receive a transaction card authentication request (e.g., payment authentication request) generated and/or transmitted via a merchant computing system or acquiring computing system via the network 106 (or, via other communication means). The payment authentication requests may be formatted according to any industry standard payment message. For example, the payment authentication request may include a number of an associated credit or debit card (PAN) or a token. The token may be used to obscure sensitive data regarding at least one of the card, the account associated with the card, the user device 101, or the customer. In some embodiments, the transaction card processing circuit 118 may be structured to issue a master payment token to a master account of a payment platform and a subordinate payment token to a subordinate account of the payment platform according to various embodiments described herein. The master payment token may be similar to a conventional token in that serves as a proxy for the payment account. However, the subordinate payment token may be subject to various rules as described herein. When the subordinate payment token is used in a transaction, the transaction card processing circuit 118 is structured to access or retrieve the rules (e.g., spending rules) of the subordinate account and authorize or decline the transaction based on the rules.

The transaction card processing circuit 118 may be embodied as a processing circuit having one or more processors coupled to one or more memory devices. Thus, the transaction card processing circuit 118 may have the structure described herein. As alluded to above, the transaction card processing circuit 118 is structured to process transaction card applications, issue and activate transaction cards, approve transactions, approve entry into web-based accounts, and/or general respond to information and requests received by the card issuer computing system 108. In some embodiments, the transaction card processing circuit 118 may include or utilize multiple processors throughout the card issuer computing system 108.

The digital platform provider computing system 103 may be owned by or otherwise associated with a digital platform service provider. In some embodiments, the digital platform provider computing system 103 is owned/operated by a first provider (e.g., a cloud service provider such as Amazon Web Services®) that contracts with one or more digital service providers. Alternatively or additionally, digital platform provider computing system 103 may be owned/operated by the same entity (e.g., Microsoft®) that is also associated with the digital service (e.g., Xbox® gaming network). The digital platform provider may be a financial institution that processes credit or debit card payments as a merchant. Moreover, the digital platform provider may contract with an acquirer provider or institution to process payments, for example, IAPB. The acquirer institution may include any commercial entity capable of maintaining merchant accounts (e.g., a merchant account held by the digital service provider), including retailers, vendors, service providers, and the like.

The digital platform provider computing system 103 includes a network logic 172 and a processing circuit 171. The network logic 172 is structured to enable the digital platform provider computing system 103 to connect to and to exchange information over the network 106 with, for example, the user device 101 and the provider institution computing system 108. For example, the network logic 172 is structured to interface with the user device 101 and thereby provide digital services to the user. For example, the network logic 172 may be configured to provide one or more downloadable applications of the digital platform provider to the user device 101. The network logic 172 may include a network interface structured to send and receive data over the network 106. For example, in some embodiments, the network logic 172 may be configured to execute one or more application programming interface (API) protocols in order to establish an API session with the provider institution computing system 108. During the API session the two computing systems may exchange data regarding a master account and/or the subordinate accounts. For example, the digital platform provider computing system 103 may have embedded within an interface provided to a customer a login screen to the provider institution computing system 108. The user may enter login credentials (e.g., master credentials and/or subordinate credentials) via the login screen, which then may cause the digital platform provider computing system 103 to execute the necessary protocols to initiate the API session and exchange information regarding the user associated with the credentials. The information may be used by the digital platform provider computing system 103 to create an account with the digital provider and/or process transactions (IAPB) based on one or more rules as described herein.

The processing circuit 171 may be embodied as a processing circuit having one or more processors coupled to one or more memory devices. Thus, the processing circuit 171 may have the structure described herein. As alluded to above, the processing circuit 171 may be structured to host a gaming network, provide streaming services, and/or provide other services. In some embodiments, the processing circuit 171 may include or utilize multiple processors throughout the digital platform provider computing system 103. The digital platform provider computing system 103 may include a memory that is configured to store account information for one or more users subscribed or enrolled within an account of the digital platform provider computing system 103. The account information may include information that identifies the user (e.g., legal name, address, etc.), payment account information for the user (e.g., a credit/debit card number, expiration date, CVV, token, account number of a payment account, etc.), and/or one or more user preferences. The user preferences may include rules that restrict the use of the payment account. For example, a user preference may be that the user wishes to have any purchases authenticated by prompting the user for additional information (e.g., a CVV of a stored credit card) before any transaction can be made using it. For example, responsive to the processing circuit 171 receiving, from the user device, a request to make a IAP, the processing circuit 171 may verify the IAP is allowed according to the user preferences (and rules if accessible) before generating and transmitting a payment authorization request to the provider institution associated with the payment information.

The ATM 104 includes a network interface circuit 182, a processing circuit 181, and an input/output interface 183. The network interface circuit 182 is structured to establish connections with other computing systems (e.g., the user device 101, the provider institution computing system 108, etc.) via the network 106. The network interface circuit 182 may include program logic that facilitates connection of the ATM 104 to the network 106. For example, the network interface circuit 182 may include a combination of wireless network transceivers (e.g., a Wi-Fi transceiver, etc.) and/or wired network transceivers (e.g., an Ethernet transceiver). In some arrangements, the network interface circuit 182 includes the hardware and machine-readable media sufficient to support communication over multiple channels of data communication. Further, in some arrangements, the network interface circuit 182 includes cryptography capabilities to establish a secure or relatively secure communication session in which data communicated over the session is encrypted. The network interface circuit 182 also includes short-range wireless communication components, such as a near-field communication (NFC) chip and a Bluetooth transceiver. The short-range wireless communication of the ATM enables the pairing and touchless transactions described herein.

The processing circuit 181 includes a memory 187 coupled to a processor 186. The memory 187 may be one or more devices (e.g., RAM, ROM, Flash memory, hard disk storage) for storing data and/or computer code for completing and/or facilitating certain of the various processes described herein. Memory 187 may be or include non-transient volatile memory, non-volatile memory, and non-transitory computer storage media. Memory 187 may include database components, object code components, script components, or other types of information structured for supporting the various activities and information structures described herein. The memory 187 may be coupled to the processor 186 and include computer code or instructions for executing one or more processes described herein. The processor 186 may be implemented as one or more processors, application specific integrated circuits (ASICs), field programmable gate arrays (FPGAs), a group of processing components, or other suitable electronic processing components. As such, the ATM 104 is configured to run a variety of application programs and store associated data in a database of the memory 187.

The input/output interface 183 of the ATM 104 is structured to receive input and provide output to a variety of users (e.g., the user of user device 101, a maintenance person, an employee of the provider institution, a merchant, etc.). In one embodiment, the input/output interface 183 includes an input/output device (e.g., a touchscreen, a keyboard, a card reader, a cash dispenser, a cash receiver, etc.). In another embodiment, the input/output interface 183 includes communication circuitry for facilitating the exchange of data, values, messages, and the like between an input/output device of the ATM and a user of the ATM.

Figure 2:
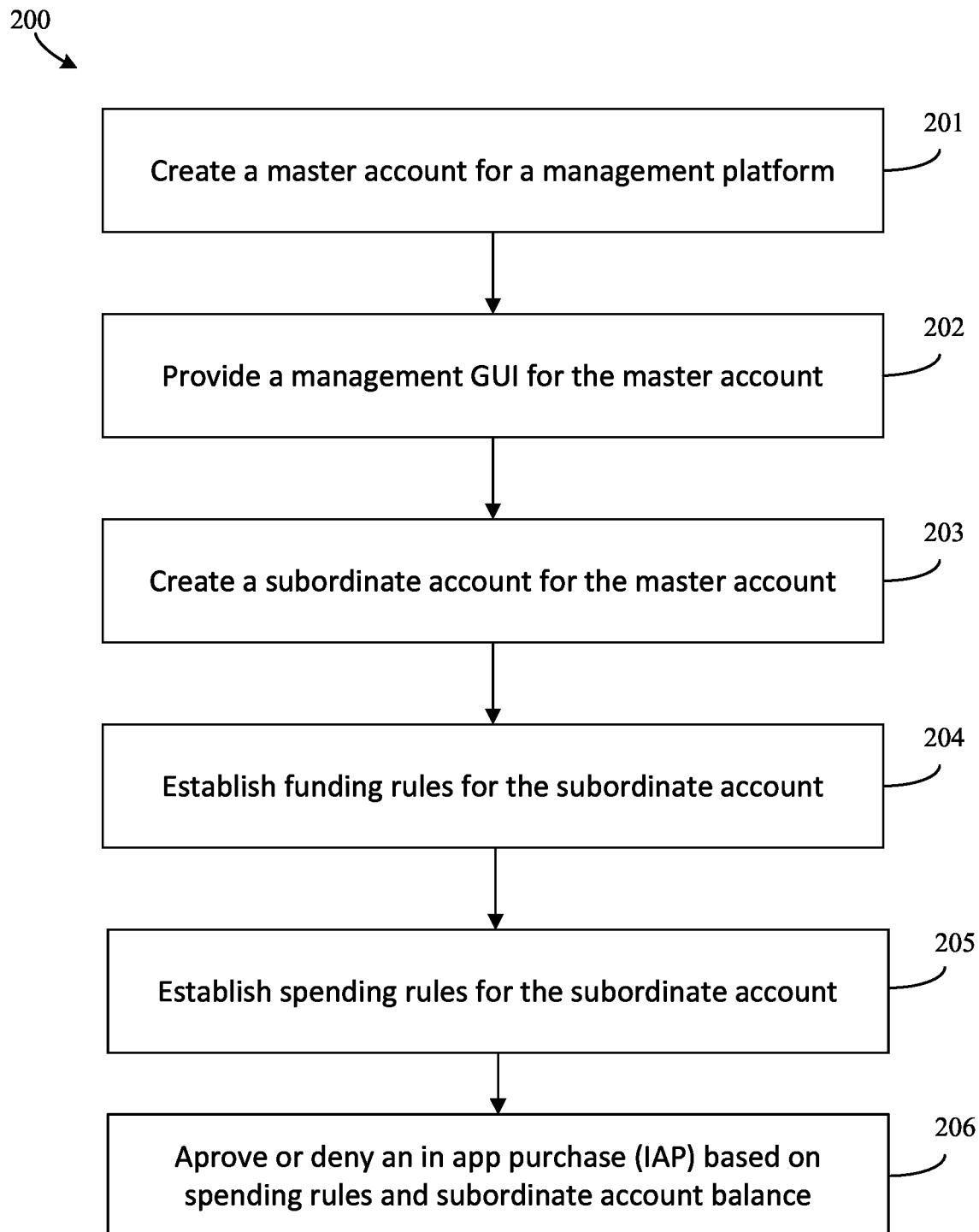
FIG. 2 is a flow diagram of a method of providing and managing a platform for use with digital platforms, according to an example embodiment.

Referring now to FIG. 2, a method 200 of providing a management platform (e.g., a payment platform) for digital platforms is depicted according to an exemplary embodiment. The method 200 is generally directed toward various processes that may be implemented to provide and manage a payment platform for digital platforms. The method generally includes creating a master account, creating a sub account for the master account, and providing a management interface for the payment platform. The master account enables a user to establish funding rules and/or spending rules for the sub account. In some embodiments, the funding rules include rules that result in automatically funding (e.g., enabling IAPB up to a set amount) the sub account based on time-based rules (e.g., $10 a week) or task-based rules (e.g., $10 for completion of mowing the lawn). The spending rules establish how the funds in the sub account may be spent. The payment platform is also capable of providing a management graphical user interface (GUI) to a first user associated with the master account and a subordinate GUI to a second user associated with the sub account with varying interactive functionalities as described herein.

It is to be appreciated that the payment platform (and management platform) and the processes and the operations thereof that are described herein may be implemented by the provider institution computing system 108, the digital platform provider computing system 103, or a combination thereof. In a first example, the provider institution computing system 108 is configured to store the account information and rules of the master account and the sub account. In a second example, the digital provider computing system 103 is configured to store the account information and rules of the master account and the sub account. In either example, the digital provider computing system 103 and the provider institution computing system 108 may communicate via, for example, an application programming interface (API) session to enable the operations described herein. Similarly, in a third example, the payment platform may be implemented by an independent (e.g., third-party computing system) that is structured to communicate with the digital platform provider computing system 103 and the provider institution computing system 108. That is, in various embodiments, the digital provider computing system 103 and the provider institution computing system 108 (or, independent platform) are configured to communicate account information (e.g., login credentials), information regarding the rules (e.g., funding rules), amount of funds available to the sub account, and/or other information.

At process 201, a master account is created. The master account may be created in response to a first user completing and submitting a form or application via, for example, a web-portal or GUI to the payment platform provided on the user device 101. The form or application may include identification information of the user (e.g., legal name, address, phone number, etc.), payment information of the user (e.g., credit/debit card information for the user, routing number, account number, online banking credentials, etc.), and/or other information. The information for the master account may then be stored within a customer database. In some embodiments, the master account is created in response to the user selecting an option during a mobile banking session (e.g., established by the user logging into an online banking account). In response to creating the master account, or in the process of creating the master account, the user may be prompted to create online login credentials (e.g., username and password) for the master account (e.g., master login credentials). The login credentials may be stored in the customer database within a data instance of the master account for future authentication.

In a first example, the master account is created at the provider institution computing system 108. In this example, the master account is created in response to the provider institution computing system 108 receiving an indication that the user wishes to enroll within the payment platform. In various embodiments, the indication may include a user selection to enroll during a mobile banking session. In such embodiments, the provider institution computing system 108 may access or retrieve the identification information and payment information directly from the customer database in order to create the master account. In other embodiments, the indication may include the user completing a form or application including customer information via GUI provided by provider institution computing system 108. In these embodiments, the provider institution computing system 108 may create the master account within the customer database using the information received as part of the form or application. In this example, the provider institution computing system 108 may generate and store a unique payment token for each of the accounts.

In a second example, the master account is created at the digital provider computing system 103. Similarly, the master account is created in response to the digital provider computing system 103 receiving an indication that the user wishes to enroll within the payment platform. The master account may be created and stored within an accounts database at the digital provider computing system 103. In some embodiments, the master account includes information regarding the user (e.g., identification information and payment information) that is received as part of an application or form or automatically accessed from an existing account at the computing system (e.g., if the user is an existing account holder). In this example, the digital provider computing system 103 may use the same payment information for each of the master and sub accounts.

At process 202, a management graphical user interface (GUI) is provided. The management GUI may be provided in response to the first user logging into the master account via a web portal or mobile application (e.g., application 155) using the master login credentials. For example, the management GUI may be displayed on the user device 101. The management GUI generally provides the first user with the ability to interact with the payment platform and to create and manage a sub account. In some embodiments, the management GUI allows the first user to enable a timer to limit and adjust the amount of time that the second user may spend on a particular digital platform. Moreover, the management GUI may also allow the first user to establish additional sub accounts, add or remove funding and spending rules on each sub account, display a dashboard outlining details of the sub account (e.g., usage of each digital platform integrated with the sub account, a ledger of IAPB made from the sub account, and/or trends or graphical depiction of trends of the sub account). In some embodiments, the management GUI may include one or more icons that enable the first user to turn off a user device being used by the second user and/or restrict the second user from a digital provider. Various examples of the management GUI are provided below in reference to FIGS. 3 and 4.

At process 203, a subordinate account (e.g., sub account) is created. The sub account is an account associated with and subordinate to the master account (i.e., the subordinate account is linked to the master account and vice versa). For example, the sub account is subject to one or more rules (e.g., funding rules or spending rules) established by the master account. For example, the first user may log in, via a web portal to the payment platform, to the master account using the master login credentials. Upon successfully logging in, a management GUI may be provided to the first user via the customer device 101. In various embodiments, the management GUI includes a selectable option (e.g., icon or graphic) that, when selected, allows the first user to create the sub account. Moreover, the management GUI may prompt the first user to enter in information regarding a second user (e.g., name, gamer tag, alias, etc.) and/or create login credentials for the sub account (e.g., sub login credentials). Alternatively or additionally, the first user may enter in contact information (e.g., email address, phone number, etc.) of the second user and, responsive to the creation of the sub account, the payment platform may send a link (e.g., hyperlink) to the entered contact information that enables the second user to establish/provide the sub login credentials of their choice. In the first example, the master account is created at the provider computing system 108 (e.g., within the customer database). In the second example, the master account is created at the digital provider computing system 103 (e.g., within the account database).

At process 204, funding rules for each of the one or more sub accounts are established. The funding rules are established via the master account and imposed by the digital platform and/or provider institution computing system onto the sub account in order to define how the sub account will be funded. For example, the funding rules are one form of preferences of the first user that the payment platform is able to implement on the second user. The funding rules may be received from the first user via the user device 101, for example, in response to the first user beginning an authenticated web session in the master account. In some embodiments, the funding rules may include automated time-based rules to fund the sub account (e.g., a regular allowance). For example, a regular allowance icon may be selected on the management GUI that allows the first user to define a particular amount of funds (e.g., $10) that are to be added to the sub account with a time-based option (e.g., weekly, monthly, one-time, and/or a particular date). In response to the selections of the first user, the payment platform stores the selected funding rule within the customer database thereby binding the funding rule to the sub account.

Alternatively or additionally, the funding rules may include event-based rules. For example, event-based rules may allow the second user to cause funds to be added to (or subtracted from) the sub account in response to completion, incompletion, or initiation of one or more events (e.g., chores, report cards, etc.). The first user, via various user inputs in the management GUI, may define the event-based rules, for example, by selecting an icon (e.g., an event-based icon) that responsively prompts the first user to provide additional information. For example, the prompt allows the first user, via the management GUI, to enter in a name of the event (e.g., mow the lawn) (or, a list of predefined events may be provided), an amount of funds to be added for the event (e.g., $10), a deadline to be completed (e.g., 24 hours or a particular time and date), and/or instructions (e.g., "Blow off driveway when complete."). In response to the payment platform receiving the selection of the event, the payment platform may send a notification or push notification to the second user that prompts the second user of the event-based opportunity to receive additional funds. Alternatively or additionally, the payment platform updates a GUI that is accessible to the second user in response to the second user logging into the sub account. The second user may then mark the task or event complete via a selection or user input on the GUI. In response to the second user marking the event completed, a notification (e.g., text message, email, and/or push notification) may automatically be sent to the first user. Alternatively or additionally, the payment platform may update the management GUI to indicate that an event has been completed. In some embodiments, the funds are added to the sub account automatically after the event is marked complete. In other embodiments, the first user may first need to verify that the task or event is complete before the funds are added to the sub account. The first user may verify the completion of the task or event, for example, by responding to the notification (e.g., "yes" or "no") or by logging into the master account and selecting a verified/completed or not verified/not completed option. If the event or task is verified, the payment platform may automatically fund the sub account. If the event or task is not verified, the payment platform may automatically transmit a notification to the second user that the event has not been completed and no funds will be transferred.

At process 205, spending rules for the sub account are established. The spending rules define how funds within the sub account may be spent. For example, the spending rules may be stored in a database in response to changes or additions made via the master account. In some embodiments, the provider institution and/or the digital platform provider computing system is able to access the spending rules and determine whether an attempted transaction should be authorized based thereon. In some embodiments, the sub account has no spending rules and the second user is free to use the funds at their discretion. In other embodiments, the spending rules include a restriction from particular IAPB such as a restriction from purchasing new characters or a restriction from playing games with certain content ratings (e.g., restriction based on age appropriate content). These rules may be referred to as content-based spending rules Moreover, the payment platform may automatically notify the first user when a transaction is made via an automatically generated notification (e.g., text, push notification, etc.). Additionally or alternatively, the payment platform may monitor and store all of the transactions attempted and/or completed from the sub account and provide a ledger (e.g., via the management GUI) to the first user. In some embodiments, the second user, for example via the GUI, may request to purchase a blocked item (e.g., override a rule), and in response, the payment platform send the request to the first user.

At process 206, an approval or denial of a transaction from the sub account is made. For example, the second user may attempt to make an IAP in a game (e.g., Fortnite®) provided on a first user device (e.g., a PlayStation®). In such example, in order to access the game the second user may be logged onto an account associated with a digital provider computing system 103 (e.g., PlayStation Network®). As alluded to above, the digital provider computing system 103 includes a merchant terminal functionality that, in response to the attempted IAP, causes the digital provider computing system 103 and/or the user device 101 to generate a payment transaction request to a provider institution computing system 108 associated with the payment account stored at the digital provider computing system 103 based on the account preferences. In an example where the payment platform is hosted or implemented on the digital platform provider computing system 103, the digital provider computing system 103 may access the information in the sub account in order to verify the IAP transaction based on the amount of funds in the sub account and the spending rules.

In an example where the payment platform is hosted or implemented on the provider institution computing system 108, the digital provider computing system 103 may access the information in the sub account via establishing an API session with the provider institution computing system 108 in order to verify the IAP transaction based on the amount of funds in the sub account and the spending rules. In yet another example, where the payment platform is hosted or implemented on the provider institution computing system 108, the digital provider computing system 103 may attempt transmit a payment authorization transaction to the provider institution computing system 108 with a payment token unique to the sub account, and the provider institution computing system 108 may authorize or deny the payment authorization request based on the rules of the sub account. For example, in some embodiments, the sub account may automatically be provided with a payment token or payment account number (PAN) that is unique to the sub account. Continuing the example, the second user may associate the payment token or PAN (e.g., payment information) with a respective account at the digital provider and, when a payment authorization request is received that identifies the merchant (e.g., PlayStation®), the payment account (e.g., the sub account), and payment amount for the IAP, the provider institution computing system 108 may authorize or deny the transaction request based on the funding amount and/or spending rules. In such example, the provider institution computing system 108 may transmit a notification or message (e.g., text, email, etc.) to the second user that provides a reason for the authorization or denial.

Figure 3:
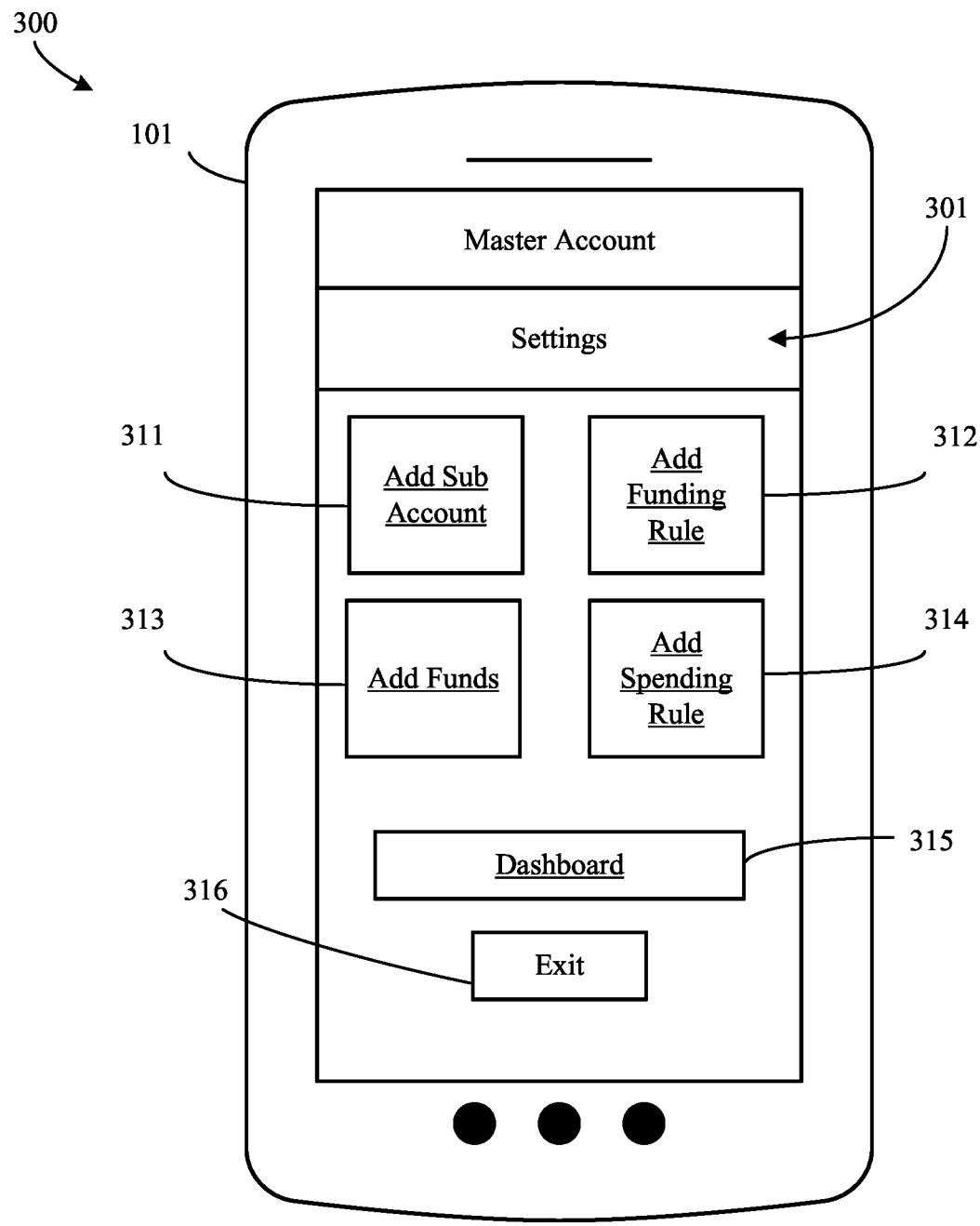
FIG. 3 depicts a customer device displaying a settings page on a management graphical user interface (GUI), according to an example embodiment.

Referring now to FIG. 3, an image 300 of a customer device displaying a management GUI settings page according to an example embodiment is shown. For example, the image 300 include a depiction of the user device 101 displaying a settings screen 301 of the master account. In this way, the first depiction of the user device 101 is an example of a user-facing management GUI related to process 202. In an example, the management GUI, and particularly, the settings page may be displayed on the user device 101 responsive to the payment platform successfully authenticating the first user via, for example, the master login credentials and/or biometric data entered into the user device.

The settings screen 301 includes a first selectable icon 311 to add a subordinate account, a second selectable icon 312 to add/remove a funding rule, a third selectable icon 313 to add funds to a sub account, a fourth selectable icon 314 to add a spending rule, a dashboard icon 315, and an exit icon 316. The first selectable icon 311, for example, provides a user-facing example of a user experience of creating a subordinate account similar to as described in reference to process 203. The second selectable icon 312 provides a user-facing example of a user experience of adding or removing a funding rule similar to as described in process 204. The third selectable icon 313 provides a user-facing example of a user experience of adding or removing a spending rule similar to as described in process 205.

Figure 4:
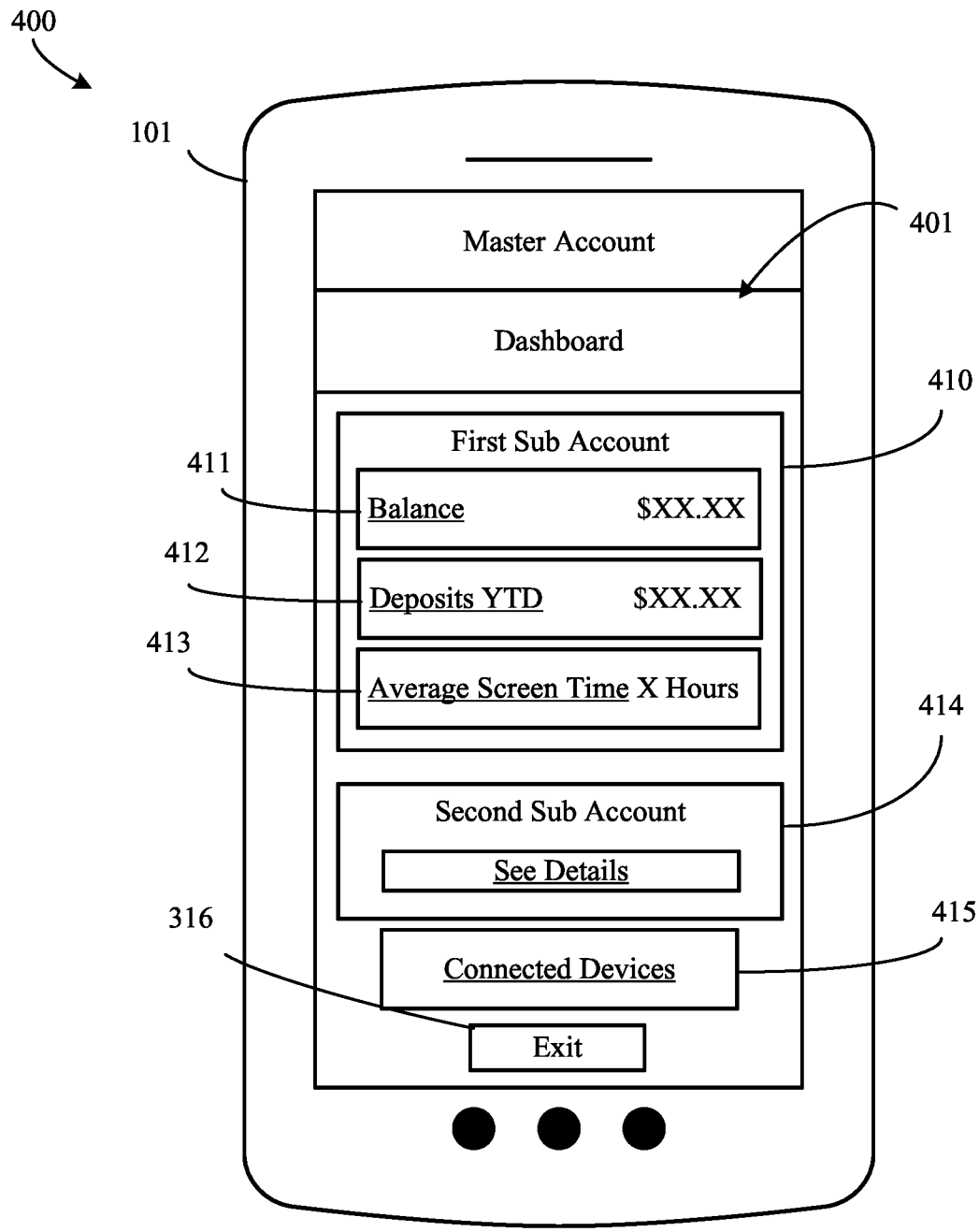
FIG. 4 depicts a customer device displaying a dashboard on a management graphical user interface (GUI), according to an example embodiment.

Referring now to FIG. 4, an image 400 of a customer device displaying a management GUI dashboard according to an example embodiment is shown. For example, the image 400 includes a depiction of the user device 101 displaying a dashboard 401 of the master account. The dashboard 401 is structured to display to the first user (e.g., owner of the master account) data such as meta data, generalized data (hours spent per day on, value of sub account, etc.), particular data (e.g., an itemized ledger of each transaction in the sub account), or trends (e.g., value of the sub account over time, time spent on each digital platform for each account, etc.) thereof.

In this example, the dashboard 401 includes a summary of a first sub account 410, a selectable icon 414 to see a second (or third) sub account in more details, a second selectable icon 415 to see a list of the devices connected to the sub accounts (e.g., digital platforms that each of the sub accounts are connected to and associated metadata), and exit icon 316. In this example, the summary of the first sub account 410 includes a first graphical indicator 411 of the current balance of the first sub account, a second graphical indicator 412 of a year-to-date (YTD) total of deposits made to the sub account, and a third graphical indicator 413 of an average screen time for the first sub account (e.g., an aggregate or sum of all of the time that the first sub account is active on various connected digital platforms). In other example, the summary may include additional or different information. The first, second, and third graphical indicators 411, 412, and 413 may be selected to cause the GUI to update and display more particular data for the respective data that is being represented. The selectable icon 414, when selected via a user input, may cause the dashboard 401 to update and show a summary for the second sub account, for example, similar to the summary of the first sub account 410.

Figure 5:
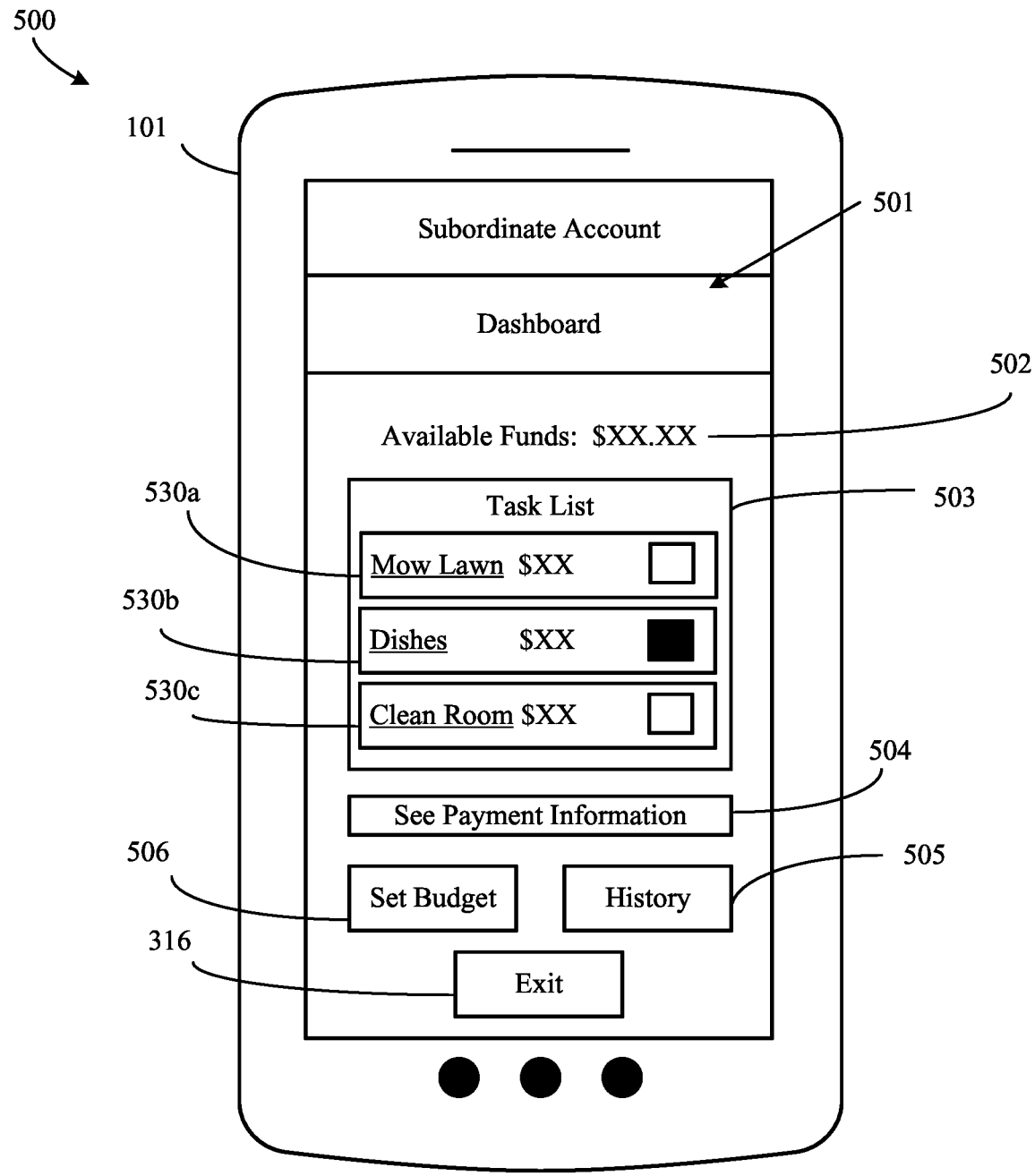
FIG. 5 depicts a customer device displaying a home screen on a subordinate GUI, according to an example embodiment.

Referring now to FIG. 5, an image 500 of a customer device displaying a sub account dashboard GUI according to an example embodiment is shown. For example, the image 500 includes a depiction of the user device 101 displaying a dashboard 501 of the subordinate account (e.g., a subordinate account GUI). For example, the dashboard 501 may be displayed on the user device 101 (e.g., mobile phone of the second user) in response to the second user logging into the subordinate account using the subordinate login credentials. The dashboard 501 is configured to allow the second user to interact with the first user, for example, via the updates that inputs may cause to master GUI or via the notifications that the first user may receive responsive to actions taken by the second user in the dashboard. In this way, the combination of the master (management) GUI and subordinate GUI improves the ability for the payment platform to interact with the first and second users in order to manage the associated digital platform accounts.

The dashboard 501 includes a first graphical indicator 502 of the available balance, a second graphical indicator 503 of a summary or list of tasks 530*a-c* or events that the second user may complete for additional funds, a first selectable icon 504 to see the payment information (e.g., unique payment token or account number) for the sub account, a second selectable icon 505 to see the history (e.g., a transaction history in the form of a ledger) of the sub account, and a third selectable icon 506 to set budget goals. The list of tasks 530 *a-c* includes an indication of the task, event, or chore that needs to be completed for each task, an indication of the funding amount to be received for successful completion of the respective task, and a selectable box for the second user to select. Once selected, the payment platform receives an indication that the task has been completed and proceeds similar to as described above.

The third selectable icon 506 to set budget goals, when selected, may cause the dashboard 501 to update and provide the second user with a variety of fields to enter in a budget goal and create a savings plan. For example, after selecting the third selectable icon 506, the second user may enter a goal of saving for a new game that is coming out and, more particularly, that the second user needs a particular amount ($60) by a particular date (mm/dd/yyyy). In response to the payment platform receiving an indication of the goal (e.g., the particular amount and date), the payment platform may suggest savings or budgeting options based on an analysis of the current balance, historical deposits, recurring or time based funding rules, and/or available tasks to complete. In some embodiments, optionally, the payment platform may create a second account (e.g., a savings account) within the sub account that is inaccessible to the second user until the particular date. In some embodiments, the new game may be automatically downloaded on the release date in response to the budget goal being met. In some embodiments, the budget goals may be set by the first user via the master or management GUI.

Figure 6:
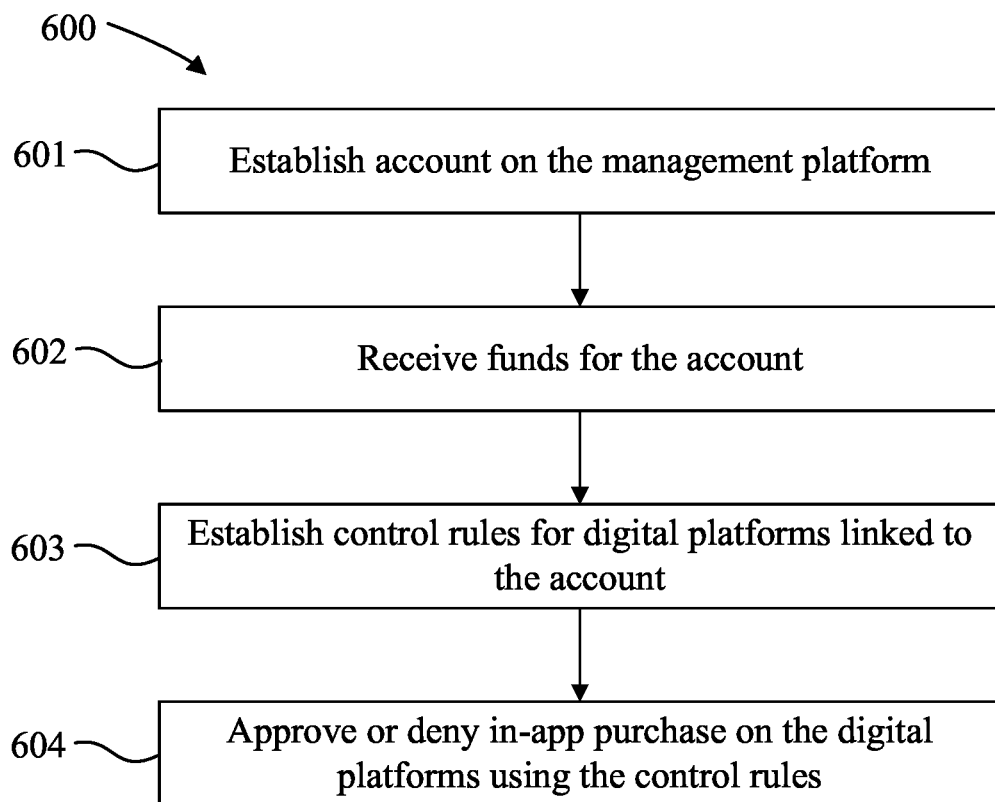
FIG. 6 is a flow diagram of a method of providing a management platform to control funds and payments on digital platforms, according to an example embodiment.

Referring now to FIG. 6, a method 600 of providing a management platform (e.g., a payment platform) to control funds and payments on digital platforms is depicted according to an exemplary embodiment. In some embodiments, the method 600 includes a centrally managed platform (e.g., the management platform hosted by the provider institution computing system 108) that allows for the dynamic management of funds for payments on various digital platforms (e.g., Hulu®, PlayStation®, etc.) hosted on respective digital platform computing systems 103. In various embodiments, the management platform allows for an adult, via a master account on the management platform, to have dynamic control over the attempted transactions from one or more dependents, via respective sub-accounts (e.g., subordinate accounts, sub accounts), on the various digital platforms. Beneficially, the method 600 allows for one central management system (e.g., the provider institution computing system 108) to allow the dependent to make authorized transactions on multiple connected digital platforms (e.g., Hulu®, Netflix®, Amazon®, etc.) in a controlled and dynamic manner. In this regard, all of the payment decisions are made/controlled by the management platform (e.g., provider institution computing system 108). For example, a parent may allow a dependent to make a purchase on Xbox® for a new game or purchase, however, the parent may not allow the dependent to have uncontrolled access to their payment accounts.

In an operation 601, a user establishes an account on the management platform. In various embodiments, operation 601 may include similar operations as described in reference to FIG. 2 for creating an account. For example, the user may navigate to a web page, via a personal computing device, associated with the management platform. The provider institution computing system 108 may provide a user interface to the personal computing device that includes various options such as an option to establish an account and/or to sign into an existing account (e.g., via application 155). In response to the user selecting the option to establish the account, the user interface may be updated to display additional options such as an option to enroll an existing account for the user from the provider (e.g., a checking or savings account) into an account for the management platform and/or an option to manually enter in information for the user. In an example where the user selects the option to enroll an existing account (e.g., a checking account), the user interface may be updated to display an online login portal where the user may enter in credentials for the existing account. Upon successful authentication of the login credentials, the provider institution computing system 108 may automatically create an account for the user using the information stored at the provider institution computing system 108 regarding the user (e.g., from an accounts database).

In another example, the user may log in to an existing account at the provider via an online login portal using login credentials. Upon successful authentication of the login credentials, the provider institution computing system 108 may update a dashboard that includes an option for the user to enroll or establish an account on the management platform. In response to receiving a user selection to establish the account, the provider institution computing system 108 may automatically create an account for the user. In some embodiments, the user may be prompted to enter in various identifying information, via the user interface, that the provider institution computing system 108 then uses to establish the account for the user. The account at this stage may be said to be the master account. The user may then be able to log in to the master account in order to add or establish one or more sub-accounts as described above in reference to FIG. 2. In this way, the user is able to establish a master account and add sub-accounts that the master account will have various controls over.

In an operation 602, the account is funded via one or more ingestion points. In some embodiments, the account may include a first fund repository for the master account and respective fund repositories for each of the sub-accounts. In this example, the user may be able to deposit funds directly (e.g., manual commands) or indirectly (e.g., based on rules and events) into each of the repositories. For example, the user may deposit funds via an ATM 104. The ATM 104 may display menu options via a user interface that the user may select to fund to perform various account management tasks. The user may deposit funds in the master account or in the sub accounts via cash, check, or other currency means via a deposit device of the ATM 104. The user may also make deposits directly into one or more digital platform accounts via the ATM 104. The digital platforms may be communicably linked to the ATM such that the funds deposited into the ATM can be transferred directly to the associated digital platform account. A user may link a digital platform account to a sub account via user device 101 (e.g., via application 155) and the provider institution computing system 108 may store the digital platform account information and correlate a sub user account to the linked digital platform accounts.

The provider institution computing system 108 may be communicatively coupled to the ATM and may allow a user to deposit funds into the digital platform accounts via an ATM deposit.

As an example and in some embodiments, the user may enter a code unique to a sub account or unique to a digital platform account linked to the sub account on the ATM to enable a deposit of funds directly into the sub account or into the digital platform (e.g., a numeric, alpha, alphanumeric, etc. code). For example, the master user may enter a code linked to an Xbox Live® account of a first sub user on the ATM (e.g., via a touchscreen or other input device), and then deposit cash into the ATM after the code is validated. The Xbox Live® account may then be automatically funded in the amount of the cash deposit. Thus, the ATM 104 may communicate the received code to the provider institution computing system 108 that validates the code as being associated with an account to then enable transactions regarding that account (e.g., a physical currency deposit into the ATM to fund that account). The provider computing system 108 may generate the code, provide it to the user via the digital platform, for the user to then subsequently provide to the ATM 104. The provider computing system 108 may store the generated code in a database for matching it with a code received from an ATM. The code may be specific to at least one of a user and to an account (e.g., an account on a digital platform), such that only deposits (i.e., transactions) involving that code and the at least one of the user and the account are permitted by the computing system 108.

In other embodiments, the ATM 104 may generate and display a GUI on a display screen of the ATM 104 that may prompt a user to enter an ID (or other identifier and/or credential) associated with a master account (or to enter a debit or credit card to authenticate the user attempting to access the account). The ATM 104 (or, provider computing system 108) may authenticate the user or may transmit the authentication information to the provider institution computing system 108 for authentication. Once the user is authenticated as an authorized user of the account, the provider institution computing system 108 may search a database to determine whether there are any linked sub accounts or digital platform accounts. If there are sub accounts or digital platforms linked, the provider institution computing system 108 may generate a unique GUI that lists the identified accounts. The GUI may be provided to and displayed on the display screen of the ATM 104. The GUI may allow the user to select a sub account or digital platform account from the menu options, e.g., via a touchscreen, and to subsequently deposit funds into the ATM 104. The selected sub account or digital platform account may be automatically funded in the amount of the deposit. Via the interaction of the ATM 104 and the provider institution computing system 108, the user is able to access all sub-accounts and digital platform accounts linked to the user account via a custom GUI specific to that user. The custom GUI allows the user to make deposits directly into various sub-accounts and digital platform accounts without the need go through multiple selection screens or log in to each account separately. This reduces the transaction time that the user must spend at the ATM and increases the processing speed of the ATM which does not need to update the GUI multiple times for different menu selections. The ATM may generate a single GUI screen allowing the user to make deposits directly into any linked account.

In some embodiments, the account may include a pointer list. The pointer list includes various payment methods (e.g., credit cards, debit cards, gift cards, etc.) entered by the user or automatically added by the provider institution computing system 108 based on linked financial accounts. In this example, the account may not include funds being directly added to the account or transferred to the provider institution computing system 108, rather the pointer list includes payment options that may be used to complete transactions based on allowances for respective sub-accounts. The allowance for the respective sub-accounts, as described herein, may be controlled directly or indirectly from the master account. For example, the master account may include options to add funds or add allowances directly to respective sub-accounts. Alternatively or additionally, the master account may include options to establish funding and/or spending rules that are event-based that the management platform is able to automatically manage or implement as described in further detail below in reference to FIG. 8. In some embodiments, the master account and the sub-accounts include separate fund repositories. In these embodiments, funding a sub-account from the master account includes transferring funds from the master account to the sub account. In other embodiments, the sub-accounts are not separate fund repositories from the master account. Instead, the master account includes a single repository and funding a sub-account means allowing the sub-account to debit a limited amount of funds from the master account based on the funding amount.

In an operation 603, control rules are established by the user (e.g., via the management software application 155) for each linked digital platform account. In various embodiments, the control rules include funding and/or spending rules as described above in reference to FIG. 2. For example, the funding rules may include rules that are implemented by the management platform to add funds or allowances to the sub-accounts. The spending rules may include rules that enable the management platform to either (a) approve or deny in-app purchases based on a payment message (e.g., received via the four party payment system) from a digital platform; or (b) approve or deny in-app purchases based on a direct communication to the digital platform.

In example (a), the sub-accounts may have a payment method (e.g., a token or account number) established therewith automatically or nearly automatically by the management platform. In some embodiments, the user of the sub-accounts may be able to navigate, via a user interface on a personal computing device, to a dashboard of the sub-account that displays the payment method (e.g., a debit card number with CVV and expiration date). The user may then use the payment method information to manually enter the payment option into an account at a digital provider. In this way, when the user (e.g., sub-user) attempts to make an-in app purchase at the digital provider, the digital provider generates a payment message (e.g., a payment authentication request) using the manually entered payment method and transmits the payment message (e.g., via the four party payment system) to the provider institution computing system 108. The payment message may indicate to the management platform a transaction amount, an identity of the digital provider (e.g., the merchant), and/or other information such as time stamps. The management platform (e.g., provider institution computing system 108 via one or more of issuer network logic 116 or transaction card processing circuit 118) may then approve or deny the attempted in-app purchased by determining, based on the payment message, the sub-account associated with the payment message, accessing the control rules for the sub-account, and determining whether the attempted transaction is permitted based on the control rules. For example, the control rules may include a digital provider list that establishes that only transactions from particular digital providers may be approved. In another example, the control rules may check the allowance and/or funds of the sub-account and deny the transaction if the transaction amount exceeds the allowance and/or funds in the sub-account. In yet another example, the control rules may include a time schedule that define particular times or time ranges (e.g., between 8a.m. and 8p.m. on Saturday and Sunday) that transactions may be approved using the funds from the sub-account. In this regard, the control rules may include rules that enable the management platform to implement the control rules indirectly based on the payment message received in order to approve or deny the in-app purchases from digital platforms in operation 604.

In example (b), the sub-account and/or the master account may have an established API protocol with one or more digital providers. In this example, the direct communication between the management platform (e.g., application 155 and/or provider institution computing system 108) and the digital providers allows the management platform to have control rules that can be directly implemented on or by the digital provider. In this regard, the control rules may include instructions to send rules directly to the digital provider. For example, the instructions may cause the management platform to send a first message (e.g., API message) to a first digital provider (e.g., Hulu®) that the user is allowed to purchase a particular item (e.g., one movie). The first digital provider may then only allow in-app purchases based on the message. In another example, the instructions may cause the management platform to send a second message to a second digital provider (e.g., PlayStation®) that indicates a particular fund amount (e.g., $60) that the user is able to spend. The second digital provider may then implement the control rule by only allowing transactions up to the fund amount. It is to be appreciated that the management platform may automatically send a payment method (e.g., payment method for the account, sub-account, or from the pointer list) to the digital providers via an API message upon establishment of the API protocols. In some embodiments, the digital providers may use the payment method to generate and transmit payment messages (e.g., payment authentication requests) via traditional four-party payment rails. Alternatively or additionally, the digital providers may directly debit or exchange funds with the sub-accounts or provider institution. In this regard, the management platform is able to implement the control rules in order to approve or deny (or even prevent transaction attempts) the in-app purchases from linked digital platforms in operation 604 via direct communication with the digital providers.

Figure 7:
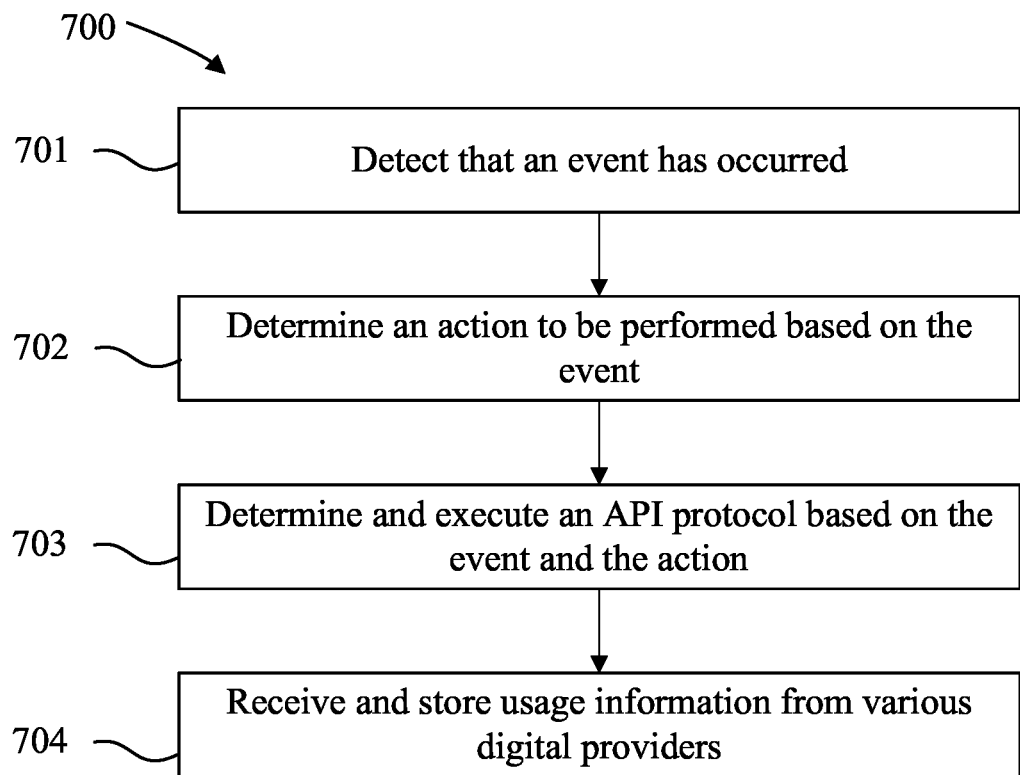
FIG. 7 is a flow diagram of a method of providing a management platform to control features on digital platforms, according to an example embodiment.

Referring now to FIG. 7, a method 700 of providing a management platform to control features on digital platforms is depicted according to an exemplary embodiment. In some embodiments, the method 700 includes a centrally managed platform (e.g., the management platform hosted by the provider institution computing system 108) that allows for the dynamic implementation of rules or fund management on various connected digital platforms (e.g., Hulu®, PlayStation®, etc.) hosted on respective digital platform computing systems 103. Beneficially, method 700 may allow for integration of the management system with the various digital platforms to control the features provided by the digital platforms (e.g., parental controls) in a dynamic and efficient manner. For example, the management platform may establish and/or store unique protocols (e.g., API protocols) with the various digital platforms that enable the management platform to control features (e.g., parental controls, time limits, etc.) of the digital platforms and/or devices associated with the digital platforms (e.g., a physical Xbox®). In this regard, an account at a digital provider may be associated or linked (e.g., via the API protocol) to a particular sub-account of the management platform. Accordingly, the method 700 provides an automatic, dynamic, and inclusive way for a parent (e.g., master user) to manage a variety of digital platforms via unique communication protocols, which improves the efficiency of the computing environment.

In an operation 701, the management platform detects that an event has occurred. The event may be a native event or non-native event as described below in reference to FIG. 8. For example, the event may be that the master user, via the master account, has updated parental controls (e.g., time limits, etc.) for particular accounts at digital providers linked with particular sub-accounts. In another example, the event may be that the sub-user has completed a task or chore that was set by the master user. Detection and verification of a completed task or chore by the management platform is discussed in additional detail below in reference to FIG. 8. Additionally or alternatively, the event may include the management platform detecting that a linked or associated account on a digital platform is active (e.g., the sub user is logged-in and active on the digital platform). For example, the management platform may receive, via an API message from a digital provider, an indication that the linked or associated account on the digital is active (e.g., the sub user is logged-in and active). In yet another example, the event may be time-based. In this regard, a schedule may be implemented for the sub-accounts. For example, after a particular time (e.g., 8 PM) the management platform may automatically perform one or more actions as described in reference to operation 702.

In an operation 702, the management platform determines an action to be performed based on the event. The action may include communicating with one or more digital providers, updating control rules, and/or communicating with one or more devices (e.g., mobile devices) associated with the master user/account and/or the sub-users/accounts. In a first example, where the event includes a completion of a task, the management platform may determine that the action to be performed is to automatically provide an incentive (e.g., time limit, fund, etc.) to the sub-user. In this regard, the management platform may determine that the completed task included an incentive of additional time (e.g., 30 minutes) of allotted time for the sub-user to access a digital platform (e.g., Xbox®). Accordingly, the management platform may determine that the action necessary to implement the incentive includes generating and transmitting a message (e.g., via an API) to the digital platform that causes the digital platform to add time to the account associated with the sub-account. In this example, the management platform may determine that the digital provider includes such functionality to enable this control. Additionally or alternatively, the management platform may determine that the action necessary to implement the incentive includes updating the control rules such that, upon receiving an indication from the digital provider that the sub-user is active, beginning a timer of 30 minutes, and after the time has expired, transmit a message back to digital provider that instructs the digital provider to deny further access to the account at the digital provider. It is to be appreciated that the management platform may perform similar operations for other events based on the functionalities of the digital providers (e.g., types of parental controls at the digital provider), the type of event detected, and/or the type of incentives to be provided.

In an operation 703, the management platform executes an application programming interface (API) protocol based on the event and the action. In this regard, the management platform may access and determine a particular API protocol that is needed to perform the action. For example, the provider institution computing system 108 may include a database of API protocols that are unique to each of the digital providers. In another example, the provider institution computing system 108 may determine that the API protocol necessary to implement the action is for a third party computing system (e.g., an indirect communication). In this regard, the management platform may communicate (e.g., send an API message) to the third party computing system and the third party computing system may forward or transmit an API message to the digital provider to enable the communication between the management platform and the digital provider. In some embodiments, the API message indicates an identity of the sub-user, an identity of the account at the digital provider associated with the sub-user (e.g., and thereby linked to the sub-account), and/or one or more instruction fields that indicate the action to be performed by the digital provider. For example, the instruction fields may include instructions to a digital provider (e.g., Microsoft®) to disable or turn off a device (e.g., an Xbox®) associated with the account.

In an operation 704, the management platform receives usage information from the various digital platform providers. In some embodiments, the management platform may also store the received usage information for displaying on a user interface of the master or sub accounts. In various embodiments, the management platform may receive real-time usage information from the digital providers (e.g., via a SOAP API). In some embodiments, the management platform may receive usage information from the various digital providers on a periodic basis (e.g., once a day, once an hour, etc.). In this regard, the management platform may limit network traffic by receiving the usage information during times associated with lower network traffic (e.g., overnight). Additionally or alternatively, the management platform may request usage information from the various digital platforms. In this regard, the management platform may limit network traffic by only requesting and receiving usage information when needed. For example, the management platform may transmit a request for usage information upon the master user logging into the master account and/or updating the user interface of the master account. In various embodiments, the usage information includes an indication of the amount of time that the sub-user was active, purchases made or attempted by the user, the hours or time of day that the sub-user was active, and/or the content (e.g., the game, show, or activity) that the sub-user was interacting with on the digital platform. The usage information may then be displayed via one or more graphical indicators to the master user, via an interface on the master account, to communicate the digital activities that the sub-users are engaged in thereby allowing master user (e.g., parent) to assess the health of the sub-users' relationship with digital activities and update control rules accordingly.

Figure 8:
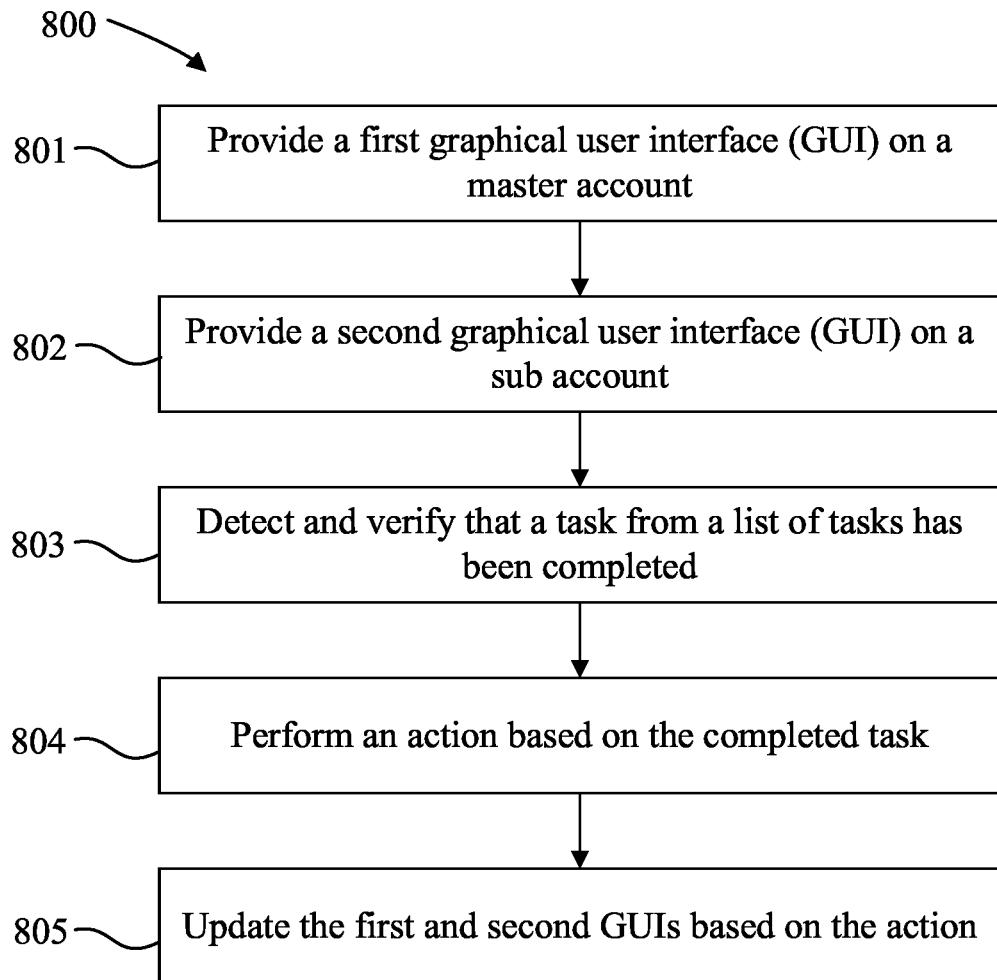
FIG. 8 is a flow diagram of a method of using native and non-native events to control incentives on a management platform for digital platforms, according to an example embodiment.

Referring now to FIG. 8, a method 800 of using native and non-native events to control incentives on a management platform is depicted according to an exemplary embodiment. In some embodiments, the method 800 includes a centrally managed platform (e.g., the management platform hosted by the provider institution computing system 108) that allows for the dynamic implementation of rules or fund management on the master and sub-accounts. In this regard, the management platform gives the master user and sub-users a unique and seamless user experience with the management system. In various embodiments, the method 800 is related to the implementation of actions (e.g., transferring funds for IAPB, allocating more time to a digital platform, etc.) in response to detecting that an event has occurred. Beneficially, the method 800 provides for a computer-based method of verifying the completion of tasks and automatically performing an action in response to the verification. For example, the action may include moving funds to an account associated with the child and/or communicating with a digital provider to provide the child with the incentive (e.g., funds or additional usage time on the connected digital platform).

In an operation 801, the management platform provides a first graphical user interface (GUI) on a master account that includes a series of options relating to adding tasks (e.g., application 155 and/or provider institution computing system 108). For example, the management platform provides the first GUI to a mobile or personal device that is accessing the management platform via an online portal or application using the master credentials. In various embodiments, first GUI is the dashboard for the master account (e.g., accessible by the master user via master credentials) that includes the functionality (e.g., via selectable options and fields) to allow for the master account to create sub-accounts, associate or link digital platforms to the account, view usage information received from the digital platforms, set tasks or chores, add or remove funds or allowances from the sub-accounts, update parental controls for the digital platforms associated with the account (e.g., sub-account), add or update control rules, and so on.

In an operation 802, the management platform provides a second GUI on a sub account that displays the tasks added by the master user (e.g., the "added tasks"). In various embodiments, the management platform provides the second GUI to a mobile or personal device associated with the user (e.g., child) of the sub-account. In some embodiments, the mobile or personal device associated with the user is added to or otherwise associated with the sub-account via the master user entering in the information regarding the mobile or personal device into the master account. The mobile or personal device associated with the user of the sub-account may be used by the user to access the sub-account, display the second GUI, receive or send texts, emails, and so on to and from the management platform. In some embodiments, the mobile device, once known or registered with the sub-account, does not require additional credentials to access and display the second GUI. Alternatively or additionally, the second GUI may be displayed on the mobile device in response to the sub user entering sub-account credentials into an online login portal accessed and displayed on the mobile device.

In various embodiments, the second GUI is the dashboard for the sub-account (e.g., accessible by the master user via master credentials) that includes the functionality (e.g., via selectable options and fields) to allow for the sub-account to interact with the respective sub-user. For example, the second GUI may display a list of tasks or chores (e.g., and respective incentives), a current allotment of time on various associated digital platforms, a fund or allowance amount, a payment method (e.g., an account number) for the sub-account, and so on. In some embodiments, the sub-user may select, via the GUI, one or more tasks or chores from the list and select an input indicating that the sub-user has completed the task. In some embodiments, the second GUI includes an option for requesting additional time or funds from the master user. In response to such a selection, the management platform may transmit a notification (e.g., SMS message, email, or push notification) to a mobile device of the master user such that the master user can review, approve, or deny the request. In this regard, the second GUI allows for the sub-user to create tasks or chores for the list that may be added upon approval from the master user.

In an operation 803, the management platform detects and verifies that a task from the added tasks has been completed (e.g., the "completed task"). The management platform may detect native and non-native tasks. Native tasks include tasks that can be automatically verified by the management platform, for example via a connection to a second computing system or an Internet-of-Things (IoT) device. Non-native tasks include tasks that cannot be automatically verified by the management platform.

A native task may include a task such as washing the dishes where a dishwasher (e.g., appliance) is smart (e.g., internet enabled, an IoT device) and coupled to the management platform (e.g., application 155 and/or provider institution computing system 108). In this example, the dishwasher may automatically transmit a message to the management platform that it has been started. In this example, a computing system of the smart appliance provider may be coupled, associated, or linked with the account at the management platform (e.g., via entry of credentials for the smart appliance provider on the first GUI that establishes an API connection). The message is received by the management platform and the management platform verifies that the task has been completed based on the message. Another example of a native task may include a task such as completion of an online task (e.g., math tutorial, lingual tutorial, etc.) where a computing system of the online task provider is coupled to the management platform. In this example, the computing system of the online task provider may be coupled to the management platform via a connection, association, or link between the sub-account and an account at the computing system of the online task provider (e.g., via a particular API protocol). In this example, the task list may include a task of completing a math tutorial on the account at the online task provider. Upon completion of the math tutorial, the online task provider may generate a message to the management platform indicating the task has been completed that automatically verifies that the task has been completed.

A non-native task may require a selection by the sub-user on the second GUI that indicates that the sub-user has completed a particular task. In some embodiments, the sub-user may report completion of a task to a virtual assistant (Siri® or Alexa®) via voice command using a microphone of the sub-user's mobile device. Upon receiving an indication from the sub-user that a task is complete, the provider institution computing system 108 may notify the master user that the sub-user has so indicated. However, without verification, the sub-user may be able to deceive the management platform. Accordingly, the master user, via the master account, may set verification rules for non-native tasks that need to be completed before the management platforms verifies that the task has been completed and automatically provides the sub-user with the respective incentive (e.g., provides funds, adds usage time, etc.). In some embodiments, each non-native task may have particular verification rule associated therewith (e.g., set via the first GUI). The verification rule may be that the sub-user is to upload a photo, take a real-time photo or video as proof of completion, and/or verify that the geolocation of a mobile device associated with the sub-user is indicative of completion. For example, the sub-user may use an associated mobile device to take a picture of a mowed lawn or made bed, the photo is then uploaded or otherwise transmitted such that the master user, via the first GUI, can see and verify the photo. In this example, the management platform may verify the completion of the task upon receiving an indication, from the master account, that the task has been completed. In some embodiments, the management system may be configured to process an image to determine if the task has been completed or has likely been completed. For example, if a task is to clean a bedroom, the management platform may use image processing to determine whether the bedroom is clean or messy. For example, the management platform may compare the submitted photo to a database containing photos of messy and clean bedrooms. If the management platform determines that the submitted photo more closely resembles the clean room photos than the messy room photos, the management platform may determine that the task has been completed. Alternatively, the management platform may send a message to the master user that the task is likely completed, which the master user can then verify. In another example, the management platform may receive a geolocation of the mobile device associated with the user upon a selection by the sub-user that the task is being started. The geolocation and/or time lapse of the geolocation may then be displayed on the first GUI. In this example, the master user is able to see that the mobile device associated with the sub-user has traced the yard thereby indicating to the master user that the sub-user has indeed mowed the lawn. The master user may then select an approval option on the first GUI that allows the management platform to verify that the task has been completed. In some embodiments, the management platform may determine whether the geolocation information indicates that a task has likely been completed. Using the example, above, the management platform may receive the time lapse geolocation data indicating that the mobile device has traced the yard and may indicate to the master user that the task is likely complete.

Depending on the type of task, geolocation data may also be used by the management platform to validate completion of a native task. For example, if one of the tasks is for a sub-user to visit a family member, the management platform may verify completion of the task based on the geolocation of the sub-user's mobile device indicating that the mobile device was present at the family member's home for a predefined period of time.

In an operation 804, the management platform determines and performs an action based on the completed task. In some embodiments, the action may be similar to the actions as described in reference to operation 702. In various embodiments, the action performed includes providing additional funds or allowances to the sub-account. The action may also include transmitting a notification to a mobile device associated with the master account that the task has been completed.

In an operation 805, the management platform updates the first and second GUIs based on the action. The first GUI may be updated to display a list of completed tasks and/or display an updated fund or allowance balance of the sub-account. In some embodiments, the first GUI may also be updated to show the current/updated time allotments that the sub-account has on each connected digital platform. In various embodiments, the second GUI is updated to no longer include the completed task in the list. In some embodiments, the second GUI is updated to graphically indicate the sub-user the number of tasks completed within a particular time period and the rewards or incentives received as a result. In this regard, the second GUI may include a graphical indicator that shows the sub-users progress to a goal. For example, the sub-user may have a goal of saving a predetermined amount (e.g., $100). The graphical indicator may include a pie chart or slider that shows that the sub-user has completed four tasks this week and thereby added an aggregated amount (e.g., $30) toward that goal. In this way, the sub-user may be incentivized to complete tasks in a disciplined manner once the progress can be visually depicted via the second GUI over time.

Figure 9:
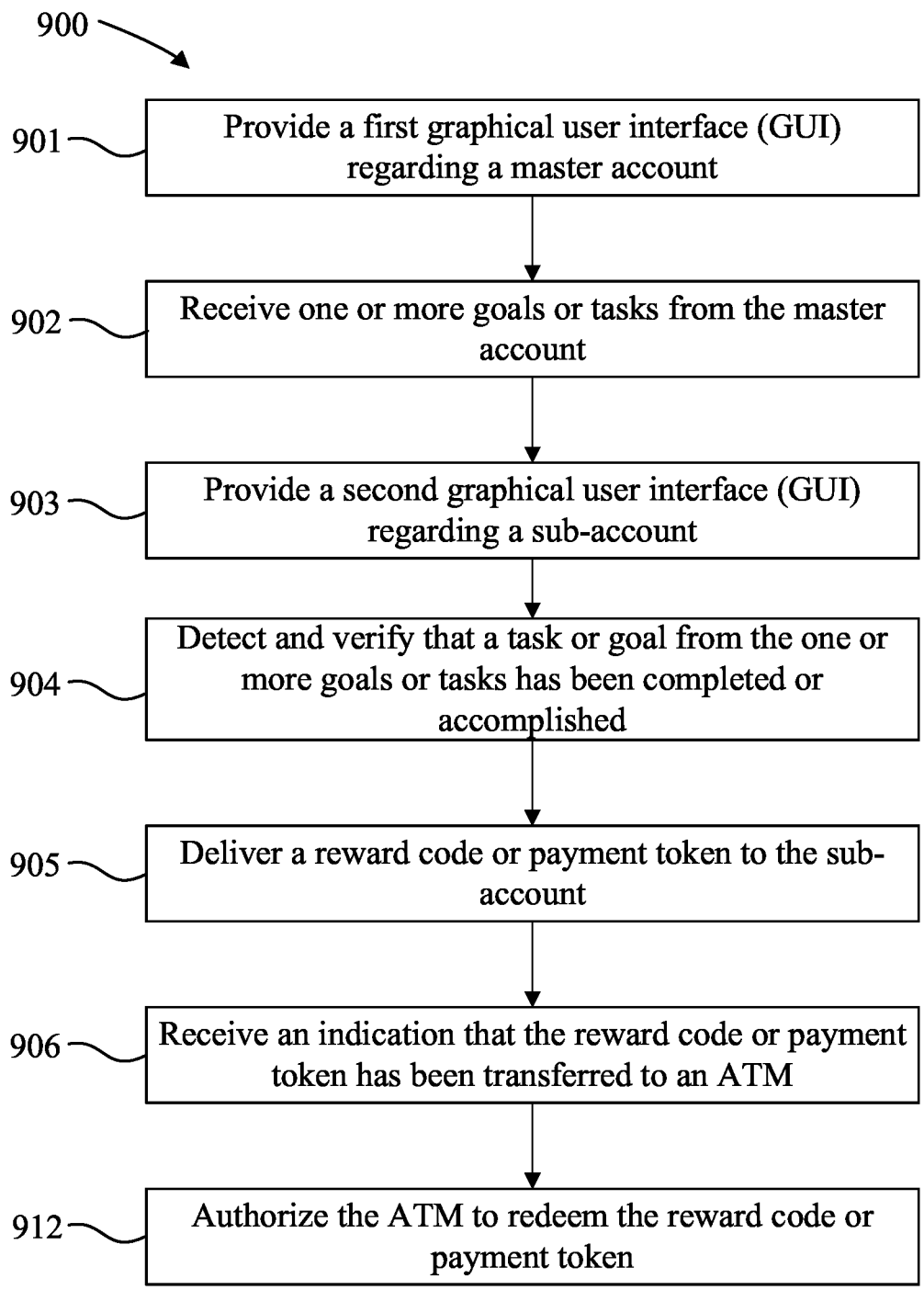
FIG. 9 is a flow diagram of a method of method of fulfilling incentives on a management platform using an automated teller machine (ATM), according to an example embodiment.

Referring now to FIG. 9, a method 900 of fulfilling incentives on a management platform (e.g., a payment platform) is depicted, according to an exemplary embodiment. The method 900 relates to issuing an ATM reward code or token in response to a completion of a goal or task (e.g. objective, etc.). In some embodiments, the method 900 includes establishing a master account and a subordinate account of the master account in the management platform (e.g., at the provider institution computing system 108). The provider institution computing system 108 is capable of providing a management GUI to a first user associated with the master account and a subordinate GUI to a second user associated with the subordinate account with varying interactive functionalities as described herein. The master account enables a user of the master account to establish goals and/or tasks for the user of the subordinate account. The user of the master account may establish an incentive associated with the completion of the goal or task. When a goal is accomplished or a task is completed, the provider institution computing system 108 may transmit an ATM code or token to the subordinate account. The ATM code or token is configured for redemption with ATM 104 (e.g., may allow the user associated with the subordinate account to withdraw cash from the master account at an ATM 104).

In an operation 901, the provider institution computing system 108 provides a first graphical user interface (GUI) on a master account that includes a plurality of icons, such as a series of options, relating to adding tasks and/or goals. For example, the provider institution computing system 108 provides the first GUI to a mobile or personal device 101 of the user of the master account (e.g., a parent) that accesses the management platform provided by the provider institution computing system 108 via an online portal or via the management software application 155 using the master credentials. In various embodiments, the first GUI is a dashboard for the master account (e.g., accessible by the master user via master credentials) that includes the functionality (e.g., via selectable options and fields) to allow creation of sub-accounts, associate or link digital platforms to the account (e.g., particular sub-accounts), view usage information received from the digital platforms, set tasks, chores, or goals, add, transfer, or remove funds or allowances from the sub-accounts, update parental controls for the digital platforms associated with the account (e.g., sub-account), add or update control rules, and so on.

In an operation 902, the provider institution computing system 108 receives, from the management software application 155 on the master user device 101, one or more goals or tasks (objectives, etc.), each with an associated incentive. The tasks may be, for example, the native tasks and/or non-native tasks discussed above with respect to FIG. 8. Goals may include academic goals, such as attaining a particular grade point average (GPA) or studying for a predetermined amount of time, health related goals, such as losing a particular amount of weight or getting a particular amount of sleep, or any other goal that the user of the master account (e.g., a parent, family member, etc.) wishes to incentivize the user of the sub account (e.g., a child, a college student, etc.) to achieve.

In an operation 903, the provider institution computing system 108 provides a second GUI relating to a sub-account that displays the tasks added by the master user (e.g., the "added tasks"). The GUI may be displayed by the application 155. Alternatively, the application 155 may generate and provide the GUI that displays the tasks added by the master user. In various embodiments, the provider institution computing system 108 provides the second GUI to a mobile or personal device associated with the user (e.g., child) of the sub-account. In some embodiments, the mobile or personal device associated with the user is added to or otherwise associated with the sub-account via the master user entering in the information regarding the mobile or personal device into the master account. The mobile or personal device associated with the user of the sub-account may be used by the user to access the sub-account, display the second GUI, receive or send text messages, email messages, and so on to and from the management platform (e.g., provider institution computing system 108). In some embodiments, the mobile device, once known or registered with the sub-account, does not require additional credentials to access and display the second GUI. Alternatively or additionally, the second GUI may be displayed on the mobile device in response to the sub user entering sub-account credentials into an online login portal accessed and displayed on the mobile device. In some embodiments, the sub user may access the second GUI via an application on the sub user's mobile device. The sub user may be able to make modifications to tasks and goals or create additional tasks or goals to be completed. The master user may accept or reject new or modified tasks or goals, or may assign an incentive to a task or goal created by the sub user. In other embodiments, the sub user may create or modify goals or tasks as well as the corresponding incentive, which the master user may approve or deny. The sub user may send a message to the master user acknowledging a new task or goal that the master user has added to the list. The application may be an application similar to application 155 that is hosted and provided by the provider institution computing system 108.

In an operation 904, the management platform (e.g., provider institution computing system 108) detects and verifies that a task has been completed or a goal has been accomplished. The management platform may detect that native and non-native tasks have been completed and/or that native and non-native goals have been accomplished. Native and non-native tasks are discussed above with respect to FIG. 8.

Native goals include goals that can be automatically detected and verified by the management platform. A device or computer system linked to the management system may provide updates to the master account indicating the sub user's progress toward a goal. The device or computer system may be communicably coupled to the provider institution computing system 108 via the network 106. The management platform may detect that a goal is complete based on information provided from the device or computer system. The management platform may compare the information to a goal and determine if the goal is met based on the information For example, a native goal may include a goal of achieving a particular GPA, where a school's computer grading system is available on the internet and coupled to the management platform via network 106. In this example, the computer grading system may automatically transmit a student's GPA to the management platform once grades are submitted to the grading system. In this example, school's computer grading system may be coupled, associated, or linked with the account at the management platform (e.g., via entry of credentials for the grading system on the first GUI that establishes an API connection). A user may link the master account to an account on a linked device or computer system. For example, a parent may log in to the school's grading system using the parent's login credentials and select options to link the master account to the master user's school grading system account that allows access to the parent's child's grades. The master user can then link that child's grades to the goals in the management platform. For example, a parent may create a goal of an "A" in math for a child. The parent may log in to the parent's account on the school's grading system and select an option to associate the child's grades to the child's (sub user's) account on the management platform or to a particular goal. The school's grading system may only transmit grade information to the management platform that the parent has access to in the grading system. In some embodiments, a linked computer system may automatically deliver data relating to the goal to the management platform when the data becomes available. In other embodiments, the management platform may ping the linked device or computer system and instruct the linked computer system to transmit any data relating to the goal (i.e., objective). With reference to the example above, the GPA is received by the management platform and the management platform verifies that the GPA meets or exceeds the goal established by the user of the master account.

As another example, a native goal may include a goal of getting a particular number of hours of sleep. In operation, a wearable device worn by the user of the sub account, such as a smart watch, is coupled to the management platform (e.g., provider institution computing system 108). In this example, the smart watch may be coupled to the management platform via a connection, association, or link between the sub-account and the wearable device (e.g., via a particular API protocol). The sub user may register the wearable device with the provider institution computing system 108 and grant the system 108 access to the information gathered and stored by the wearable device. In some embodiments, once the wearable device is registered with the provider institution computing system 108, the wearable device may automatically deliver data relating to the goal to the management platform when the data becomes available, or periodically (e.g. every ten minutes, once per day, etc.). In other embodiments, the management platform may ping the wearable device periodically and instruct the linked computer system to transmit any data relating to the goal. In either situation, progress toward the goal is received directly from the pertinent device (e.g., smart watch in this example). This may be beneficial to prevent a subordinate account user from trying to deceive the system 108 to obtain more benefits (e.g., additional access time to a digital platform, etc.). The provider institution computing system 108 may associate the data received from the device with the sub-account of the sub user based on the identifying information received from the wearable device, and the system 108 may compare the data received to the goals. The number of hours of sleep detected by the smart watch may then be received by the management platform to verify that the number of hours of sleep meets or exceeds the goal established by the master account. This allows the goal to be objectively monitored by the provider institution computing system 108 such that it may be automatically verified.

A non-native goal includes a selection by the sub-user on the second GUI that indicates that the sub-user has achieved a particular goal. The management platform detects that the goal is completed based on receiving an indication of the selection by the sub-user. The user of the master account, via the management application 155 on the master user device 101, may set verification rules for non-native goals that need to be completed before the management platform verifies that the task has been completed. In some embodiments, each non-native task may have particular verification rule associated therewith (e.g., set via the first GUI). The verification rule may require the sub user to submit a request for verification with evidence of accomplishing the goal. For example, the verification rule may be that the sub-user is to upload a photo, take a real-time photo or video as proof of having achieved the goal. For example, mobile application 155 may include a camera module that causes a camera of the sub user mobile device to activate and allows the sub user to take a picture using the sub user mobile device. For example, the sub-user may use an associated mobile device to take a picture of a report card indicating the sub-user's GPA. The photo is then uploaded or otherwise transmitted such that the master user, via the first GUI, can see and verify that the photo indicates that the goal has been accomplished. In this example, the management platform may verify the completion of the task upon receiving an indication, from the master account (via the master user), that the goal has been accomplished. In some embodiments, there may be a time limit to verify completion of a task. If a task is not verified within the time limit, the task may be reset and the sub user may be required to submit a new request for verification.

In an operation 905, the management platform (e.g., provider institution computing system 108) generates and provides/delivers a reward code or payment token to the sub account (e.g., a computing device associated with the subordinate account user). The code or token may be associated with an incentive for completing a task or achieving a goal. The provider institution computing system 108 may cause the reward code or payment token to be stored on a mobile device or personal device of the sub user (e.g., within application 155). For example, the provider computing system 108 may push the code and/or token to an application 155 on the subordinate user's device for subsequent retrieval. The code or token may be, for example, an alphanumeric code, a barcode, a QR code that may be displayed on the GUI of the sub account user device, etc. The GUI including the code or token may be displayed on the mobile or personal device of the sub user. The code or token can be used by the sub user to receive an incentive (e.g., payment) from the master account at an ATM 104. In some embodiments, the code may allow the sub user to bypass a login process on the ATM 104 without entering a PIN or inserting a debit or credit card (or another credential). For example, the ATM 104 may scan the code or receive the token via a NFC tap, which automatically navigates the ATM 104 to a code/token redemption screen. Upon validation of the code or token, the ATM 104 may fulfill the incentive. The reward code or payment token may allow the sub user to access the master account, such that the user may only obtain the incentive from the ATM (e.g., withdraw the predefined amount of currency defined by the incentive and embodied in the code or token). In some embodiments, the provider institution computing system 108 may deliver a message or notification to the mobile device of the sub user allowing the sub user to select an electronic funds transfer or an ATM cash withdrawal. If the sub user selects an electronic funds transfer, the cash reward may be transferred from the master account to the sub account. If the sub user selects an ATM cash withdrawal, the reward code or payment token may be delivered to the mobile device of the sub user.

In some embodiments, the code or token may store embedded information about the incentive, the user, an associated digital platform, and/or the provider computing system (or provider associated therewith). The code may store information regarding the identity of the user or a particular digital platform in which to deposit funds. For example, the first ten digits of an alphanumeric code may identify the account of the sub user who has received the code. When the ATM 104 receives the code, the management system may identify, based on the account number, the sub-account identified by the number and any linked digital platform or bill pay accounts. In this way, the user may transfer a code or token to the ATM 104 as part of a log in process at the ATM. As another example, the last three numbers of an alphanumeric code may identify a particular digital platform account linked to the account. For example, an alphanumeric code ending in "123" may identify a Netflix® account, while a code ending in "321" may identify an Xbox Live® account. In some embodiments, the code may be scanned and deposited without the sub user entering any log in info. For example, if a portion of the code or token identifies the sub-account and another portion identifies a particular digital platform, the sub user may immediately transmit the code and have the incentive funds deposited in the identified digital platform account without entering any other login information. This eliminates the need to select any menu options on the ATM 104, as the funds can be immediately deposited.

In some embodiments, the provider institution computing system 108 can restrict redemption of the code or token to a predefined ATM or predefined ATMs. In some embodiments, the code and/or token delivered to the sub user's mobile device may be redeemable only at predefined ATMs 104. In other embodiments, the provider institution computing system 108 may cause the reward code and/or payment token to be stored on a predefined ATM 104. The ATM 104 may display an option to redeem the reward code or payment token upon verification of the sub user's identity. For example, the master user may select, via the application 155, a specific ATM 104 for the sub user to redeem the reward code and/or payment token. In other embodiments, the sub user may select a preferred ATM 104. In some embodiments, the master user or the sub user may define an area in which the code and/or token can be redeemed at any ATM within that area. For example, the master user may define an area that is proximate the sub user's home (e.g., dorm room, apartment, etc.) such that the code or token cannot be redeemed in other locations.

In an operation 906, the provider institution computing system 108 receives an indication from the ATM 104 that the reward code or payment token has been transferred to the ATM by the sub user. The sub user may interact with the ATM input/output interface 183 to transfer the code or token to the ATM 104. For example, the ATM may have a touchscreen or keypad that the sub user may use to enter an alphanumeric code. The ATM I/O interface 183 may have a barcode scanner and/or QR code scanner. The sub user may hold the mobile device displaying the second (sub account) GUI including a barcode or QR code. The barcode scanner or QR code scanner may scan the bar code or QR code to transfer the information included therein to the ATM 104. Alternatively or additionally, a NFC device included in the mobile device of the sub user can be used to wirelessly transfer the reward token to a receiving NFC device included in the ATM I/O interface 183. Thus, the user mobile device (e.g., application 155) may receive the code or token in multiple formats. For example, the user may receive an alphanumeric code, a QR code, and an NFC token corresponding to one or more incentive. The user may submit the code or token using any of the methods described above. In this way, the code or token may be submitted via alternative methods if, for example, the ATM 104 does not include a QR code scanner or NFC reader, or if the QR code scanner or NFC reader are inoperable. Redemption of a code or token via one method may prevent subsequent redemption of the same code or token. The provider institution computing system 108 may confirm that the received code and/or token matches a stored token or code before authorizing the incentive. For example the ATM 104 may transmit the transferred code or token to the provider institution computing system 108, and the computing system 108 may compare the transmitted code or token to a database of stored codes and tokens. If the transferred code or token matches a stored code or token, the computing system 108 confirms that the code or token is valid. In some embodiments, the provider institution compares information embedded within the received the code or token to a database of information regarding generated codes or tokens and, in response to matching the information embedded in the received code or token, validates the code or token.

In some embodiments, the database may be stored locally in the ATM memory 187 and the code or token may be confirmed and validated by the ATM processing circuit 181 without being transmitted to the provider institution computing system 108. In some embodiments and responsive to receiving the code or token, the ATM processing circuit 181 may be configured to request additional information from the customer and transmit information to the provider computing system 108 for authenticating the customer. For example, the ATM processing circuit 181 may request, via the ATM I/O interface 183 that the sub user enter a PIN associated with the sub user or the sub account. The ATM I/O interface 183 may allow the sub user to transfer multiple codes or tokens to the ATM 104 in one transaction. Alternatively, the provider computing system 108 may deliver a single code associated with multiple combined incentives. The ATM 104 or the provider institution computing system 108 may generate a GUI displaying the incentive associated with the submitted code or token, which may be displayed on a screen of the ATM 104.

In an operation 907, the provider computing system 108 authorizes the ATM 104 to provide the incentive (e.g., the funds/currency predefined by the incentive). In one embodiment, the incentive is a physical currency amount. The master account may be debited the amount of the physical currency amount (e.g., cash) associated with the incentive, and the ATM I/O interface 183 may dispense the physical currency amount via a cash dispenser to the authenticated sub user. If more than one code or token has been transferred to the ATM, the ATM I/O interface 183 may dispense an amount of physical currency equal to the total of the physical currency associated with the codes and/or tokens entered.

In some embodiments, the sub user may elect to transfer the incentive (e.g., currency) to the sub-account or another account (e.g., a digital platform account or a bill pay account) without withdrawing the physical currency. For example, the ATM I/O interface 183 may display a GUI listing each of the sub-account, digital platform accounts, and bill pay accounts linked to the sub-account. The sub user may select one or more of these accounts and allocate all or a portion of the incentive funds to the selected accounts. The sub user may, for example, allocate a first portion of the incentive funds to a bill pay account to pay a water bill. The user may then transfer the remaining incentive funds to a digital platform account. Advantageously, the user may access and make deposits to any linked account via the GUI without the need to go through several selection screens or enter credentials for each linked account. Upon redemption of a code and/or token, the provider computing system 108 may deliver a confirmation (e.g. text, push notification, etc.) to the master user that the code or token has been redeemed. The confirmation may include the location of the redemption and whether cash was withdrawn or funds were transferred to an account.

Figure 10:
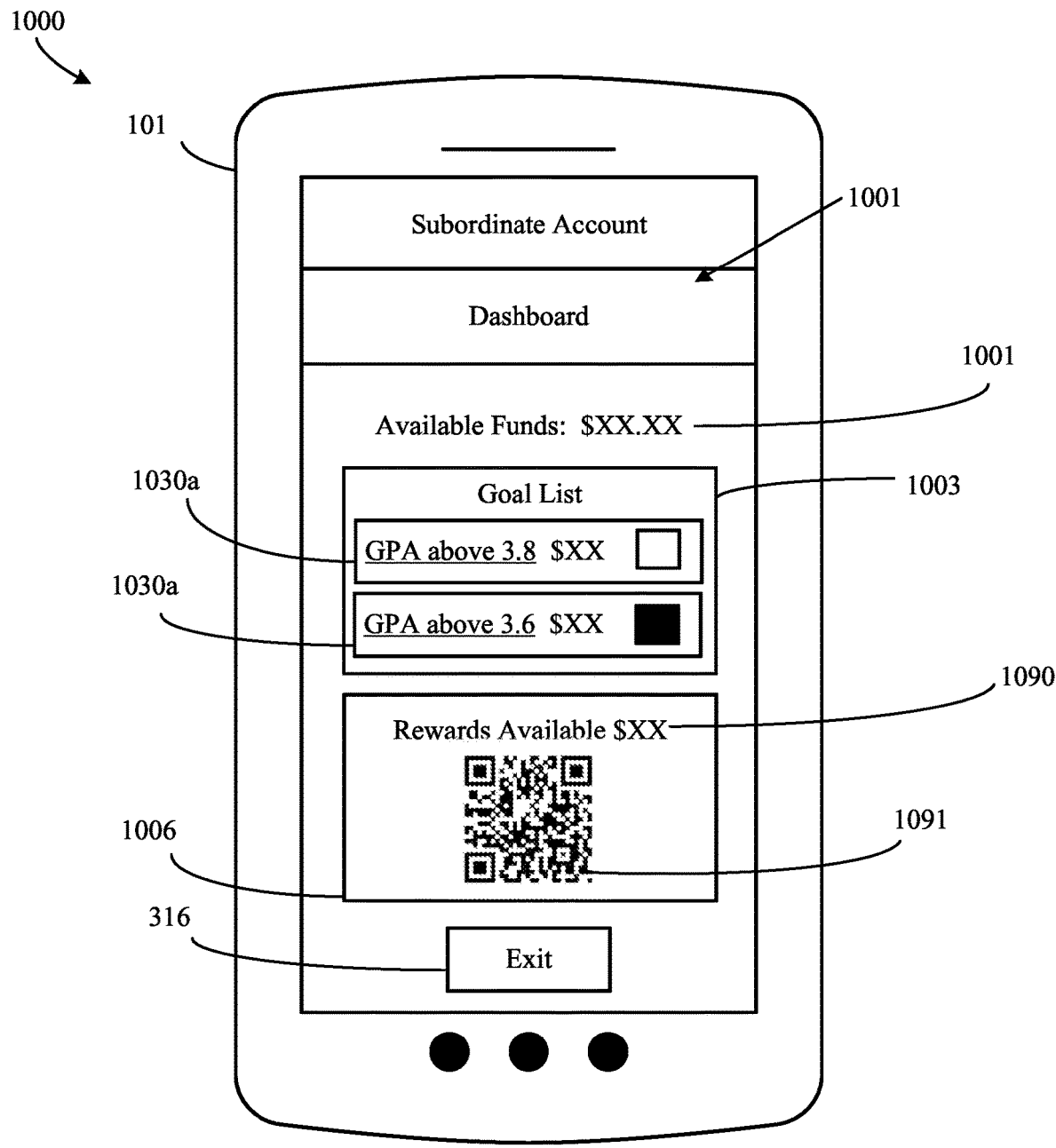
FIG. 10 depicts a customer device displaying an ATM redemption screen on a subordinate GUI, according to an example embodiment.

Referring now to FIG. 10, an image 1000 of a customer device displaying a sub account dashboard GUI according to an example embodiment is shown. For example, the image 1000 includes a depiction of the user device 101 displaying a dashboard 1001 of the subordinate account (e.g., a subordinate account GUI). For example, the dashboard 1001 may be displayed on the user device 101 (e.g., mobile phone of the second user/sub user) in response to the second user logging into the subordinate account using the subordinate login credentials. The dashboard 1001 is configured to allow the second user to interact with the first user, for example, via the updates that inputs may cause to master GUI or via the notifications that the first user may receive responsive to actions taken by the second user in the dashboard. In this way, the combination of the master (management) GUI and subordinate GUI improves the ability for the application 155 (and provider institution computing system 108) to interact with the first and second users in order to manage the associated digital platform accounts.

The dashboard 1001 includes a first graphical indicator 1002 of the available balance in the sub user's account, a second graphical indicator 1003 of a summary or list of goals 1030*a*, 1030*b* and/or tasks that the second user may complete or achieve to receive an incentive payment, and a third graphical indicator 1006 containing information relating to completer or achieved tasks and goals. The list of goals 1030*a*, 1030*b* and/or tasks includes an indication of the goal or task that needs to be completed or achieved, an indication of the funding amount to be received for successful completion of the respective task, and a selectable box for the second user to select. Once selected, the provider institution computing system 108 receives an indication that the goal or task has been achieved or completed and proceeds similar to as described above The third graphical indicator 1006 includes an indication of the amount/value of rewards available and a code 1091 associated with incentives for the goals 1030 or tasks that may be scanned at an ATM 104. When a sub user achieves or completes one or more goals or task, the third graphical indicator may appear on the dashboard 1001. The code may be an alphanumeric code that the sub user may enter into ATM I/O interface 183 via a keyboard or touchscreen or may be a QR code or barcode that the sub user can hold up to a scanner of the ATM I/O interface 183. Alternatively, instead of a code 1091, the third graphical indicator 1006 may contain instructions instructing the sub user to hold the mobile device near a NFC receiver of the ATM 104. The mobile device may transfer a token to the ATM 104 via a NFC connection.

Figure 11:
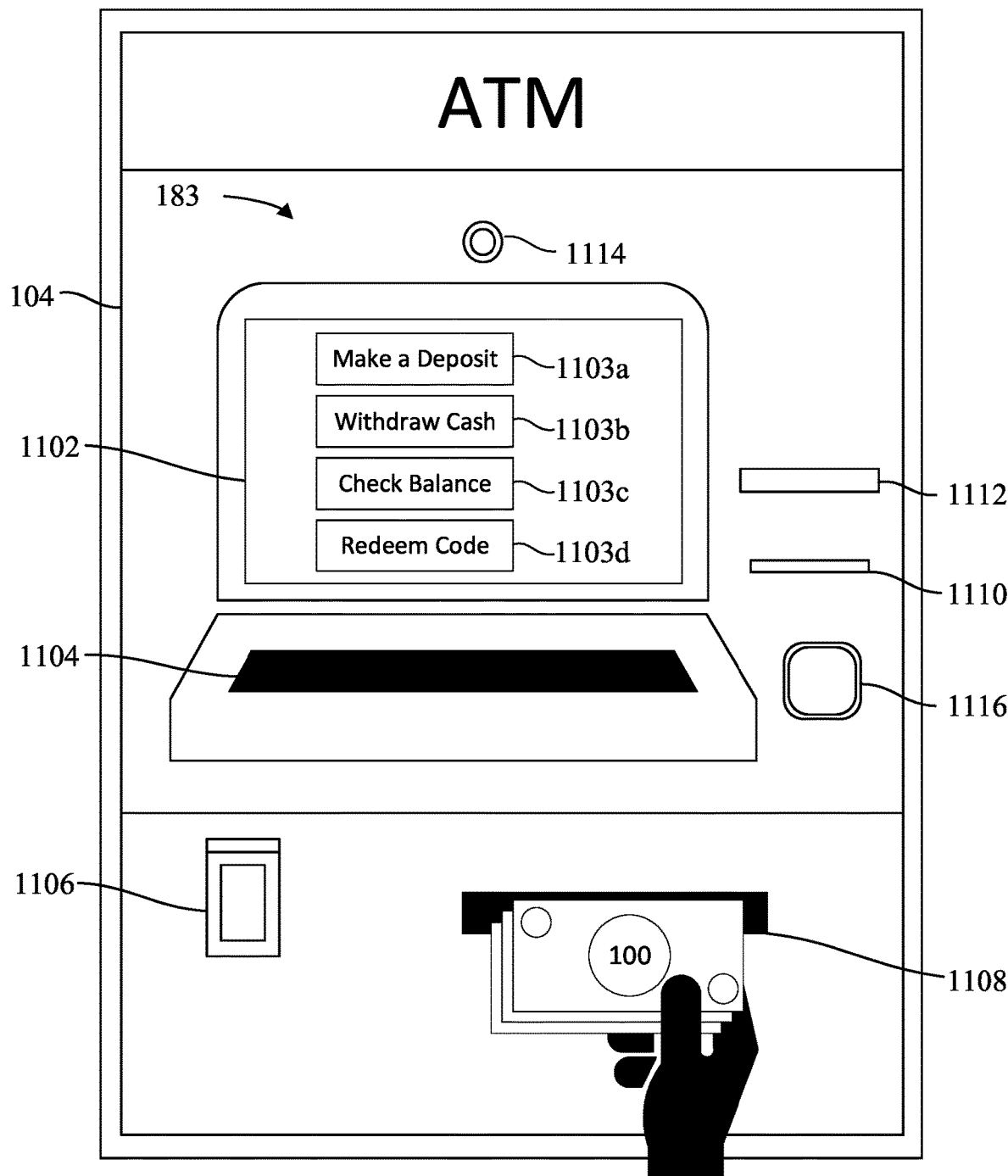
FIG. 11 depicts an ATM including an ATM user interface, according to an example embodiment.

Referring now to FIG. 11, an image of an ATM 104 including an ATM I/O interface 183 is shown according to an example embodiment. The I/O interface may include or be configured to interface with a display 1102, which may be a touchscreen. The display 1102 may display a plurality of menu options 1103*a*-1103*d* to a user. For example, the display 1102 may display an option 1103*a* to make a deposit, an option 1103*b* to make a withdrawal of cash, an option 1103*c* to check an account balance, or an option 1103*d* to redeem a reward code or payment token. If the display is a touchscreen, the user may select an option 1103*a*-1103*d* by touching the option 1103*a*-1103*d* icon on the display 1102. Other menu options may be available or may become available based on the user's selection. The display 1102 may display a touchscreen keypad which may accept alphanumeric input from the user.

The I/O interface 183 may include or be configured to interface with a keypad 1104. They keypad may have a plurality of input keys, such as alphanumeric keys and directional keys. A user may use the keypad 1104 to interact with the display 1102, For example, a user may cycle through the plurality of menu options 1103 using directional keys and may select one using an "Enter" key. The I/O interface 183 may also include or be configured to interface with a scanner 1106, which may be, for example, a QR code scanner or a barcode scanner, an NFC device 1116, a card reader 1110, a deposit device 1112 for cash and checks, a camera 1114, and a cash dispenser 1108.

A sub user may redeem a reward code or payment token for, e.g., cash at the ATM 104 via the I/O interface 183. The sub user may select the option 1103*d* to redeem a reward code by touching the option 1103*d* on the display 1102 if the display 1102 is a touchscreen or may use the keypad 1104 to cycle through the menu options 1103 to select the option 1103*d* to redeem a reward code. Once the option 1103*d* is selected, the I/O interface 183, via the display 1102, may instruct the sub user to transfer the reward code or payment token to the ATM 104. The user may optionally transfer the code or token to the ATM 104 by entering an alphanumeric code into the keypad 1104 or into a touchscreen keypad displayed on the display 1102, by scanning a QR code or barcode on the sub user's mobile or personal device using the scanner 1106, or via NFC by holding the mobile or personal device near the NFC device 1116 of the I/O interface 183. The I/O interface 183 may enable all of these input devices 1102, 1104, 1106, 1116 simultaneously or may require the sub user to select an input device via menu options on the display 1102. Once the token has been transferred and confirmed by the management system to be valid, the I/O interface 183 may dispense the, e.g., physical currency (e.g., cash, etc.) corresponding to the task or goal incentive to the sub user via cash dispenser 1108. The value of the reward may be debited from the master account. The management system may allow the master account to time and location controls for withdrawing cash, as discussed above.

In some embodiments, the provider institution computing system 108 may require an additional validation step before dispensing the cash reward to prevent, for example, a user from redeeming a reward code on a stolen phone. The I/O interface 183 may request, via display 1102, that the sub user enter a personal PIN via the keypad 1104 or a touchscreen keypad displayed on the display 1102 to confirm the user's identity. Alternatively, the ATM 104 may record an image of the user using camera 1114 and the ATM processing circuit 181 or provider institution computing system 108 may use facial recognition to confirm the user's identity. For example, the provider institution computing system 108 may include a database of user photos and may confirm that the user photographed by the camera 1114 is the user authorized to redeem the code or token based on a comparison of the photo from the camera to the photos in the database. The I/O interface 183 may request, via display 1102, that the user insert his or her own credit or debit card into the card reader 1110 to confirm the user's identity. Upon confirming that the user is the sub user associated with the sub account, the I/O interface 183 may dispense the physical currency corresponding to the task or goal incentive to the sub user via cash dispenser 1108. If the sub user wishes to deposit all or a portion of the physical currency into the sub account, the sub user may select option 1103*a* and insert the cash into the deposit device 1112. The I/O device may request, via the display 1102, that the sub user insert a credit or debit card into the card reader 1110 prior to making the deposit, or may allow the sub user to make a deposit to the sub account linked to the reward code or payment token without additional verification. In this way, the reward code or payment token may serve to verify the identity of the sub user, granting at least limited access to the sub account without the need for additional authentication. The I/O interface 183, via the display 1102, may allow the sub user to select one or more of the digital platform accounts linked to the sub account and deposit funds via the deposit device 1112 directly into the account. For example, the sub user may select an icon on the display 1102 representing the sub user's Xbox Live® account. The sub user may then insert cash into the deposit device 1112. The provider institution computing system 108 may then transfer an equivalent amount of funds to the Xbox Live® account.

Based on the foregoing, an example of operation may be as follows. A master user may create an account with provider institution computing system 108, and may create a sub-account of the master account associated with a sub user. The master user or the sub-user may link the master account and/or the sub-account with one or more digital platform accounts (e.g. an Xbox Live® account, etc.) on respective digital platform computing systems 103. The provider institution computing system 108 may provide a first GUI to the master account that can be accessed by a mobile device associated with the master user, for example, via a mobile application. The first GUI may allow the master user to enter one or more tasks or goals (e.g., chores, GPA targets, etc.) for the sub-user to complete or achieve. The system 108 may generate and provide a second GUI including a list of the goals and/or tasks to the sub-account that can be accessed by a mobile device associated with the sub user. The system 108 may then detect that one or more goals or tasks have been completed or accomplished. The system 108 may detect a native goal being completed via a message from an internet connected device (e.g., a wearable device, a school's grading system, etc.), or may detect completion of a non-native goal via an indication from the sub user via the mobile device of the sub user. The system 108 may then verify the goal or task is complete based on verification rules (e.g. submission of a photo, submission of geolocation data, etc.) submitted by the master user. The system 108 may then deliver a code (e.g. barcode, QR code, etc.) or token (e.g. NFC token, etc.) to the mobile device of the sub user. The sub user may then transmit the code to an ATM 104, for example, by holding the mobile device up to a code scanner or NFC reader of the ATM 104. The ATM 104 may then provide the code or token, or information about the code or token, to the computing system 108. The computing system 108 may compare the code or token to a database of codes and tokens to determine whether the code is valid and the incentive associated with the code. The ATM 104 may request further identity verification from the user (e.g. a PIN, debit card number, etc.). Once the code or token and the identity of the sub user is verified, the computing system 108 authorizes the ATM 104 to redeem the code or token. The sub user may elect to have the ATM 104 dispense cash or may deposit the incentive funds in the sub-account or a digital platform account linked to the sub-account.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" or "computing system" may include hardware structured to execute the associated functions described herein. In some embodiments, each respective "circuit" or "computing system" may include machine-readable media for configuring the hardware to execute the associated functions described herein. The "circuit" or "computing system" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" or "computing system" may include any type of component for accomplishing or facilitating achievement of the associated operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" or "computing system" may also include one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the associated operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" or "computing system" as described herein may include components that are distributed across one or more locations.

An exemplary system for implementing the overall system or portions of the embodiments might include a computer(s), including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of using native and non-native events to control incentives, the method comprising:
    creating, by a processing circuit, a master account;
    creating, by the processing circuit, a subordinate account linked to the master account;
    receiving, by the processing circuit and from the master account, a first task and an associated incentive for the first task;
    detecting, by the processing circuit, a native or non-native event regarding the first task, wherein detecting the native event comprises receiving a message directly from a device linked to the processing circuit, the message comprising geolocation data of a user device associated with the subordinate account, and wherein detecting a non-native event comprises receiving an indication from the user device associated with the subordinate account, the indication comprising at least one of the geolocation data, a photograph, or a video;
    determining, by the processing circuit, a completion of the first task by at least one of analyzing the at least one of the photograph or the video to detect the non-native event or comparing the geolocation data to a location associated with the first task to detect the native event or the non-native event; and
    implementing, by the processing circuit, an action corresponding to the associated incentive based on detecting the completion of the first task.

2. The method of claim 1, further comprising receiving, by the processing circuit and from the master account, a verification rule associated with the first task.

3. The method of claim 1, wherein the geolocation data includes at least one of an indication of an instantaneous geolocation of the user device or a time lapse of the geolocation of the user device over a predefined time period.

4. The method of claim 1, wherein detecting a non-native event further comprises receiving, by the processing circuit, a verification message from a user device associated with the master account.

5. The method of claim 1, wherein the implemented action includes sending, by the processing circuit to a digital platform coupled thereto, a command to add additional access time to the digital platform for a digital platform account associated with the subordinate account.

6. The method of claim 1, wherein the implemented action includes sending, by the processing circuit to a digital platform coupled thereto, a command to turn off the digital platform.

7. A system, comprising:
    a processing circuit comprising a memory coupled to a processor, the memory storing instructions therein that, when executed by the processor, cause the processing circuit to:
    create a master account;
    create a subordinate account linked to the master account;

receive from the master account, a first task and an associated incentive for the first task;

detect a native or non-native event regarding the first task, wherein detecting the native event comprises receiving a message directly from a device linked to the processing circuit, the message comprising geolocation data of a user device associated with the subordinate account, and wherein detecting a non-native event comprises receiving an indication from the user device associated with the subordinate account, the indication comprising at least one of the geolocation data, a photograph, or a video;

determine a completion of the first task by at least one of analyzing the at least one of the photograph or the video to detect the non-native event or comparing the geolocation data to a location associated with the first task to detect the native event or the non-native event; and implement an action corresponding to the associated incentive based on determining the completion of the first task.

8. The system of claim 7, wherein the instructions, when executed by the processor, further cause the processing circuit to receive, from the master account, a verification rule associated with the first task.

9. The system of claim 7, wherein the geolocation data includes at least one of an indication of an instantaneous geolocation of the user device or a time lapse of the geolocation of the user device over a predefined time period.

10. The system of claim 7, wherein detecting a non-native event further comprises receiving a verification message from a user device associated with the master account.

11. The system of claim 7, wherein the implemented action includes sending, to a digital platform, a command to add additional access time to the digital platform for a digital platform account linked to the subordinate account.

12. The system of claim 7, wherein the implemented action includes sending, to a digital platform, a command to turn off the digital platform.

13. A non-transitory computer readable media having computer-executable instructions embodied therein that, when executed by a processor of a provider institution computing system, cause the processor to perform operations comprising:

creating a master account;

creating a subordinate account linked to the master account;

receiving, from the master account, a first task and an associated incentive for the first task;

detecting a native or non-native event regarding the first task, wherein detecting the native event comprises receiving a message directly from a device linked to the processor, the message comprising geolocation data of a user device associated with the subordinate account, and wherein detecting a non-native event comprises receiving an indication from the user device associated with the subordinate account, the indication comprising at least one of the geolocation data, a photograph, or a video;

determining a completion of the first task by at least one of analyzing the at least one of the photograph or the video to detect the non-native event or comparing the geolocation data to a location associated with the first task to detect the native event or the non-native event; and implementing an action corresponding to the associated incentive based on determining the completion of the first task.

14. The non-transitory computer readable media of claim 13, wherein the operations further comprise receiving, from the master account, a verification rule associated with the first task.

15. The non-transitory computer readable media of claim 13, wherein the implemented action includes sending, to a digital platform, a command to add additional access time to the digital platform for a digital platform account linked to the subordinate account.

16. The non-transitory computer readable media of claim 13, wherein the geolocation data includes at least one of an indication of an instantaneous geolocation of the user device or a time lapse of the geolocation of the user device over a predefined time period, wherein the operations further comprise comparing, by the processor.

17. The non-transitory computer readable media of claim 13, wherein detecting a non-native event further comprises receiving a verification message from a user device associated with the master account.

\* \* \* \* \*